(12) United States Patent
Wankhede

(10) Patent No.: US 12,443,619 B1
(45) Date of Patent: Oct. 14, 2025

(54) PREDICTIVE MAPPED FORMATTING FOR DATA RELATED TO A FORMAT INCONSISTENCY ERROR VIA MACHINE LEARNING

(71) Applicant: Optum, Inc., Minnetonka, MN (US)

(72) Inventor: Sanjay Wankhede, Edison, NJ (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/777,730

(22) Filed: Jul. 19, 2024

(51) Int. Cl.
G06F 16/20 (2019.01)
G06F 16/215 (2019.01)
G06F 16/25 (2019.01)
G06F 16/903 (2019.01)
G06F 30/27 (2020.01)

(52) U.S. Cl.
CPC .......... G06F 16/258 (2019.01); G06F 16/215 (2019.01); *G06F 16/90344* (2019.01); *G06F 30/27* (2020.01)

(58) Field of Classification Search
CPC ................ G06F 16/215; G06F 16/258; G06F 16/90344; G06F 30/27
See application file for complete search history.

(56) References Cited

U.S. PATENT DOCUMENTS 9,235,812 B2  1/2016  Scholtes
11,709,857 B2  7/2023  Basu et al.
2022/0027740 A1*  1/2022  Dong .................. G06F 40/30
2022/0342900 A1*  10/2022  Basu .................. G06N 20/00
2023/0273847 A1*  8/2023  Vegulla .............. G06F 11/0754
707/602

FOREIGN PATENT DOCUMENTS

WO  2023/235533 A1  12/2023

OTHER PUBLICATIONS

Gupta, et al., "Machine Learning Approach of Semantic Mapping in Polystore Health Information Systems", International Journal of Computer Information Systems and Industrial Management Applications, vol. 13, pp. 222-232, Aug. 12, 2021.

* cited by examiner

Primary Examiner — Diedra McQuitery
(74) Attorney, Agent, or Firm — Alston & Bird LLP

(57) ABSTRACT

Various embodiments of the present disclosure provide predictive mapped formatting for data. The techniques may include receiving an input structured data object, identifying a format inconsistency error for the input structured data object, generating a predictive mapped format data object for an input data format of the input structured data object by using a predictive machine learning model, initiating a presentation of a validation user interface that reflects the predictive mapped format data object, and storing the predictive mapped format data object in response to a confirmation input to the validation user interface.

20 Claims, 7 Drawing Sheets

PREDICTIVE MAPPED FORMATTING FOR DATA RELATED TO A FORMAT INCONSISTENCY ERROR VIA MACHINE LEARNING

BACKGROUND

Various embodiments of the present disclosure address technical challenges related to ingesting, aggregating, managing, processing, and/or transforming data from multiple disparate data formats. Traditional data processing engines may receive datasets for a data processing task from various third parties that may record data in different, incompatible data formats. Different data formatting preferences and standards across collaborating computing entities present several technical challenges that historically hinder various computing tasks by preventing direct comparisons between and the aggregation of data received from different sources. These are traditional addressed by enforcing common, or canonical, data scheme. However, doing so is error prone, decreases collaboration between computing entities, and increases the computing resources expended to ingest data from different entities. In some cases, differing data formats may prevent the aggregation of data by a single platform, thereby requiring repeated calls to external platform to repeatedly extracting data segments from a data source for a downstream task, such as a machine learning task or an application programming interface (API) task for an electronic interface. In this case, the extracted data segments are often not adequately formatted for the downstream task and therefore require user input or data conversion operations that may be time-consuming, resource intensive, and/or error prone.

Various embodiments of the present disclosure make important contributions to traditional data processing engines and data processing techniques by addressing these technical challenges, among others.

BRIEF SUMMARY

Various embodiments of the present disclosure provide data processing and/or machine learning techniques that improve upon traditional data processing engines and/or traditional data processing techniques. To do so, some embodiments of the present disclosure provide an intelligent data processing pipeline that utilizes machine learning to cleanse and/or format data received from one or more data sources. In some embodiments of the present disclosure, the data may be intelligently formatted for a particular data processing task such as, for example, a machine learning task or an application programming interface (API) task for an electronic interface. For example, the resulting formatted data may be provided with improved quality for one or more downstream systems associated with one or more data processing tasks. This, in turn, enables an improved data processing pipeline and, in some embodiments, an improved machine learning pipeline that directly addresses technical challenges within the realm of traditional data processing engines and/or traditional data processing techniques, such as inaccurate formatting of data, time-consuming ingestion of data, resource intensive transformation of data, and/or inaccurate datasets for data processing tasks, among others.

In some embodiments, a computer-implemented method includes receiving, by one or more processors, an input structured data object comprising a plurality of input data elements that are structured according to an input data format; identifying, by the one or more processors, a format inconsistency error for the input structured data object based on a comparison between the input data format and a plurality of historical mapped format data objects; in response to identifying the format inconsistency error, (i) generating, by the one or more processors and using a predictive machine learning model, a predictive mapped format data object for the input data format based on the plurality of input data elements of the input structured data object and a plurality of predictive features associated with the plurality of historical mapped format data objects, and (ii) initiating, by the one or more processors, a presentation of a validation user interface that reflects the predictive mapped format data object; and in response to a confirmation input to the validation user interface, storing, by the one or more processors, the predictive mapped format data object as a historical mapped format data object of the plurality of historical mapped format data objects.

In some embodiments, a computing system comprises memory and one or more processors that are communicatively coupled to the memory, the one or more processors are configured to receive an input structured data object comprising a plurality of input data elements that are structured according to an input data format; identify a format inconsistency error for the input structured data object based on a comparison between the input data format and a plurality of historical mapped format data objects; in response to identifying the format inconsistency error, (i) generate, using a predictive machine learning model, a predictive mapped format data object for the input data format based on the plurality of input data elements of the input structured data object and a plurality of predictive features associated with the plurality of historical mapped format data objects, and (ii) initiate a presentation of a validation user interface that reflects the predictive mapped format data object; and in response to a confirmation input to the validation user interface, store the predictive mapped format data object as a historical mapped format data object of the plurality of historical mapped format data objects.

In some embodiments, one or more non-transitory computer-readable storage media includes instructions that, when executed by one or more processors, cause the one or more processors to receive an input structured data object comprising a plurality of input data elements that are structured according to an input data format; identify a format inconsistency error for the input structured data object based on a comparison between the input data format and a plurality of historical mapped format data objects; in response to identifying the format inconsistency error, (i) generate, using a predictive machine learning model, a predictive mapped format data object for the input data format based on the plurality of input data elements of the input structured data object and a plurality of predictive features associated with the plurality of historical mapped format data objects, and (ii) initiate a presentation of a validation user interface that reflects the predictive mapped format data object; and in response to a confirmation input to the validation user interface, store the predictive mapped format data object as a historical mapped format data object of the plurality of historical mapped format data objects.

DETAILED DESCRIPTION

Figure 1:
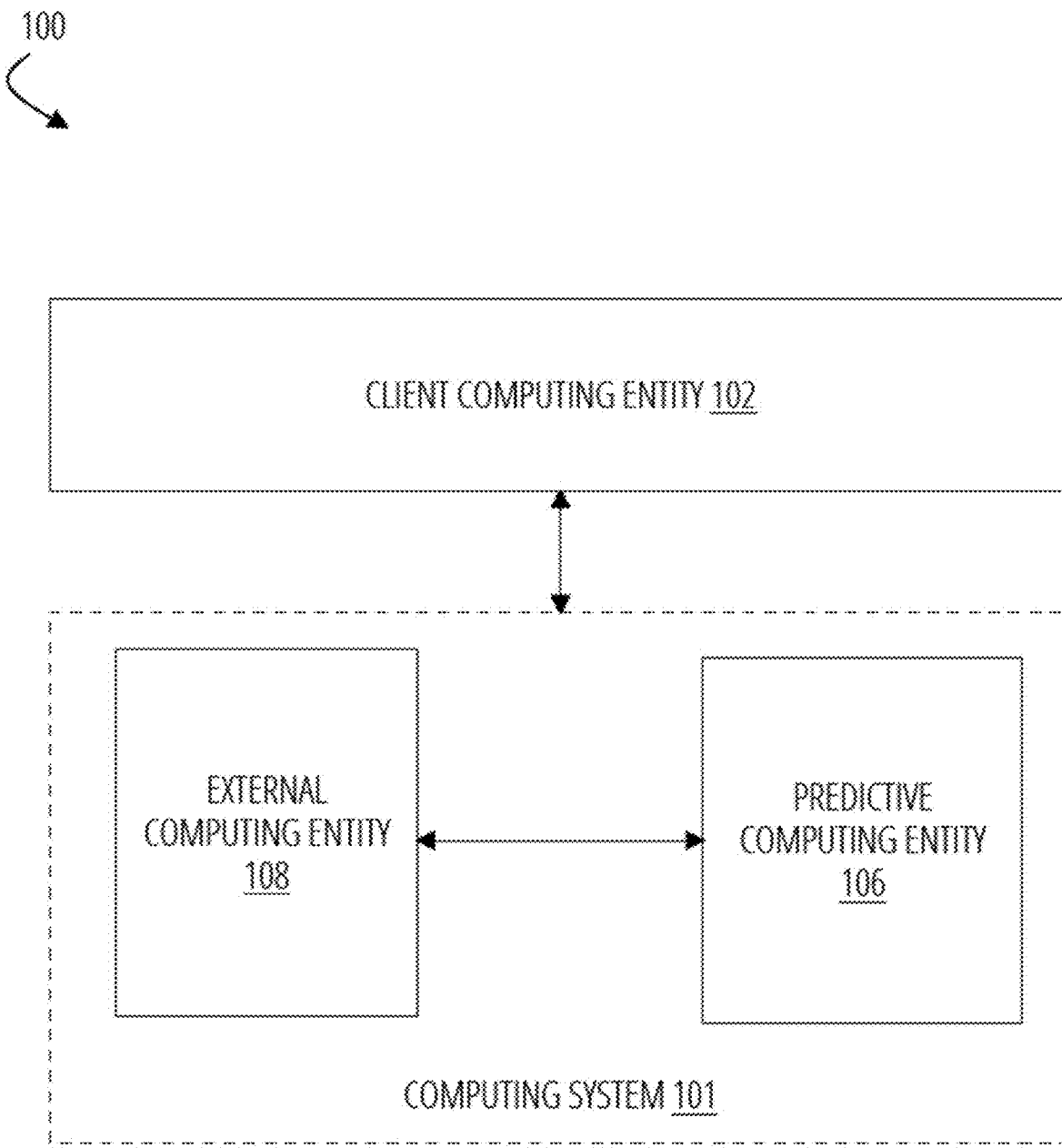
FIG. 1 provides an example overview of an architecture in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 provides an example overview of an architecture 100 in accordance with some embodiments of the present disclosure. The architecture 100 includes a computing system 101 configured to provide a data processing pipeline that utilizes machine learning to cleanse and/or format data from one or more data sources. In some embodiments, the computing system 101 may be configured to intelligently format the data for a particular data processing task such as, for example, a machine learning task or an application programming interface (API) task for an electronic interface. For example, the resulting formatted data may be provided with improved quality for one or more downstream systems associated with one or more data processing tasks. In some embodiments, the computing system 101 may be configured to structure and/or aggregate data from disparate data sources. For example, the computing system 101 may structure and/or aggregate data from disparate data sources by: identifying a data type for a data structure configured in a particular data format, in response to a determination that the data type is unknown, mapping data elements of the data structure into a data mapping for the data structure by utilizing a predictive learning model, providing the data mapping to a user via an electronic user interface to confirm accuracy of the data mapping, and/or generating output data for a downstream system based on the confirmed data mapping. The example architecture 100 may be used in a plurality of domains and not limited to any specific application as disclosed herewith. The plurality of domains may include healthcare, banking, industrial, manufacturing, education, retail, enterprise, to name a few.

In accordance with various embodiments of the present disclosure, one or more machine learning models may be trained to map data elements of a data structure into a data mapping for the data structure. The models may form at least a portion of a data processing pipeline and/or a machine learning pipeline that may be configured to automatically cleanse and/or format the data structure. This technique will lead to more accurate and reliable predictive modeling techniques that may be efficiently used for a diverse set of different cases. In some examples, the computing system 101 may facilitate a graphical user interface (GUI) wizard that is accessible at the client computing entity 102 to control a user interface at the client computing entity 102. The GUI wizard may include a computing service that is invoked by the client computing device 102. The GUI wizard may facilitate access to the data processing pipeline and/or a machine learning pipeline by the client computing device 102 to enable a presentation of one or more specialized user interfaces of the present disclosure.

In some embodiments, the computing system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The computing system 101 may include a predictive computing entity 106 and one or more external computing entities 108. The predictive computing entity 106 and/or one or more external computing entities 108 may be individually and/or collectively configured to receive requests, confirmation input from client computing entities 102, process the requests and/or confirmation to generate outputs, such as predictive mapped format data objects, and/or the like. In some embodiments, the predictive computing entity 106 and/or one or more external computing entities 108 may be individually and/or collectively configured to provide a related visualization and/or user interface (e.g., a validation user interface) to the client computing entities 102. As discussed in further detail herein, the predictive computing entity 106 and/or one or more external computing entities 108 comprise storage subsystems that may be configured to store input data, data objects, training data, and/or the like that may be used by the respective computing entities to perform predictive data analysis, machine learning modeling, and/or training operations of the present disclosure. In addition, the storage subsystems may be configured to store model definition data used by the respective computing entities to perform various predictive data analysis, machine learning, and/or training tasks. The storage subsystem may include one or more storage units, such as multiple distributed storage units that are connected through a computer network. Each storage unit in the respective computing entities may store at least one of one or more data assets and/or one or more data about the computed properties of one or more data assets. Moreover, each storage unit in the storage systems may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, the predictive computing entity 106 and/or one or more external computing entities 108 are communicatively coupled using one or more wired and/or wireless communication techniques. The respective computing entities may be specially configured to perform one or more steps/operations of one or more techniques described herein. By way of example, the predictive computing entity 106 may be configured to train, implement, use, update, and evaluate machine learning models in accordance with one or more training and/or inference operations of the present disclosure. In some examples, the external computing entities 108 may be configured to train, implement, use, update, and evaluate machine learning models in accordance with one or more training and/or inference operations of the present disclosure.

In some example embodiments, the predictive computing entity 106 may be configured to receive and/or transmit one or more datasets, objects, and/or the like from and/or to the external computing entities 108 to perform one or more steps/operations of one or more techniques (e.g., predictive techniques, classification techniques, user interface techniques, and/or the like) described herein. The external computing entities 108, for example, may include and/or be associated with one or more entities that may be configured to receive, transmit, store, manage, and/or facilitate datasets, such as one or more third-party data sources, and/or the like. The external computing entities 108, for example, may include data sources (e.g., third-party data sources) that may provide such datasets, and/or the like to the predictive computing entity 106 which may leverage the datasets to perform one or more steps/operations of the present disclosure, as described herein. In some examples, the datasets may include an aggregation of data from across a plurality of external computing entities 108 into one or more aggregated datasets. The external computing entities 108, for example, may be associated with one or more data repositories, cloud platforms, compute nodes, organizations, and/or the like, which may be individually and/or collectively leveraged by the predictive computing entity 106 to obtain and aggregate data for a prediction domain.

In some example embodiments, the predictive computing entity 106 may be configured to receive a trained machine learning model (e.g., a trained predictive machine learning model) trained and subsequently provided by the one or more external computing entities 108. For example, the one or more external computing entities 108 may be configured to perform one or more training steps/operations of the present disclosure to train a machine learning model, as described herein. In such a case, the trained machine learning model may be provided to the predictive computing entity 106, which may leverage the trained machine learning model to perform one or more inference and/or predictive modeling steps/operations of the present disclosure. In some examples, feedback (e.g., evaluation data, ground truth data, etc.) from the use of the machine learning model may be recorded by the predictive computing entity 106. In some examples, the feedback may be provided to the one or more external computing entities 108 to continuously train the machine learning model over time. In some examples, the feedback may be leveraged by the predictive computing entity 106 to continuously train the machine learning model over time. In this manner, the computing system 101 may perform, via one or more combinations of computing entities, one or more prediction, training, and/or any other machine learning-based techniques of the present disclosure.

A. Example Computing Entity

Figure 2:
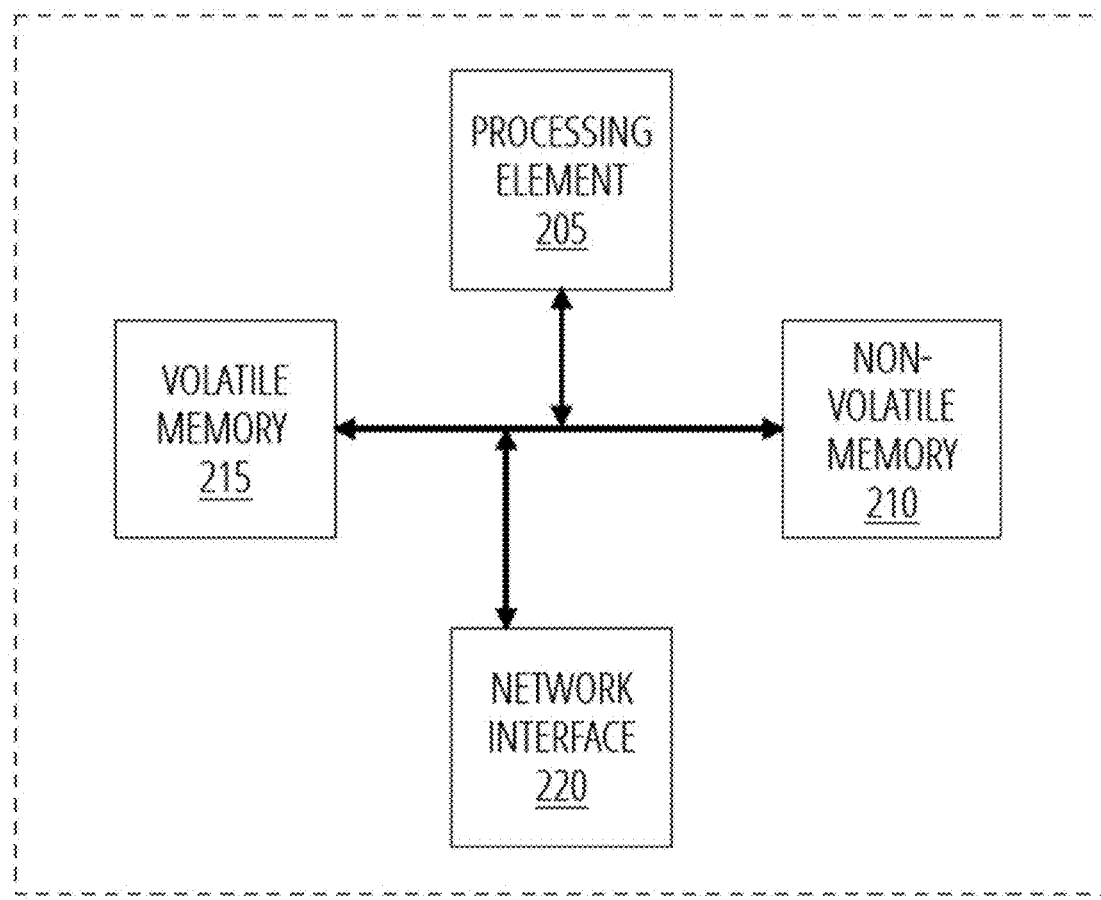
FIG. 2 provides an example predictive data analysis computing entity in accordance with some embodiments of the present disclosure.

FIG. 2 provides an example computing entity 200 in accordance with some embodiments of the present disclosure. The computing entity 200 is an example of the predictive computing entity 106 and/or external computing entities 108 of FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, training one or more machine learning models, monitoring, evaluating, comparing, and/or similar terms used herein interchangeably. In some embodiments, these functions, operations, and/or processes may be performed on data, content, information, and/or similar terms used herein interchangeably. In some embodiments, the computing entity (e.g., predictive computing entity 106, etc.) may train and use one or more machine learning models described herein. In other embodiments, a first computing entity (e.g., predictive computing entity 106, etc.) may use one or more machine learning models that may be trained by a second computing entity (e.g., external computing entity 108) communicatively coupled to the first computing entity. The second computing entity, for example, may train one or more of the machine learning models described herein, and subsequently provide the trained machine learning model(s) (e.g., optimized weights, code sets, etc.) to the first computing entity over a network.

As shown in FIG. 2, in some embodiments, the computing entity 200 may include, or be in communication with, one or more processing elements 205 (also referred to as processors, processing circuitry, and/or similar terms used herein interchangeably) that communicate with other elements within the computing entity 200 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the computing entity 200 may further include, or be in communication with, non-volatile media (also referred to as non-volatile storage, memory, memory storage, memory circuitry, and/or similar terms used herein interchangeably). In some embodiments, the non-volatile media may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile media may store databases, database instances, database management systems, data, applications, programs, program modules, scripts, code (e.g., source code, object code, byte code, compiled code, interpreted code, machine code, etc.) that embodies one or more machine learning models or other computer functions described herein, executable instructions, and/or the like. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

In some embodiments, the computing entity 200 may further include, or be in communication with, volatile media (also referred to as volatile storage, memory, memory storage, memory circuitry, and/or similar terms used herein interchangeably). In some embodiments, the volatile media may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, code (source code, object code, byte code, compiled code, interpreted code, machine code) that embodies one or more machine learning models or other computer functions described herein, executable instructions, and/or the like being executed by, for example, the processing element 205. Thus, the databases, database instances, database management systems, data, applications, programs, program modules, code (source code, object code, byte code, compiled code, interpreted code, machine code) that embodies one or more machine learning models or other computer functions described herein, executable instructions, and/or the like may be used to control certain aspects of the operation of the computing entity 200 with the assistance of the processing element 205 and operating system.

As indicated, in some embodiments, the computing entity 200 may also include one or more network interfaces 220 for communicating with various computing entities (e.g., the client computing entity 102, external computing entities, etc.), such as by communicating data, code, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In some embodiments, the computing entity 200 communicates with another computing entity for uploading or downloading data or code (e.g., data or code that embodies or is otherwise associated with one or more machine learning models). Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing entity 200 may include, or be in communication with, one or more input elements, such as a keyboard input, a mouse input, a touch screen/display input, motion input, movement input, audio input, pointing device input, joystick input, keypad input, and/or the like. The computing entity 200 may also include, or be in communication with, one or more output elements (not shown), such as audio output, video output, screen/display output, motion output, movement output, and/or the like.

B. Example Client Computing Entity

Figure 3:
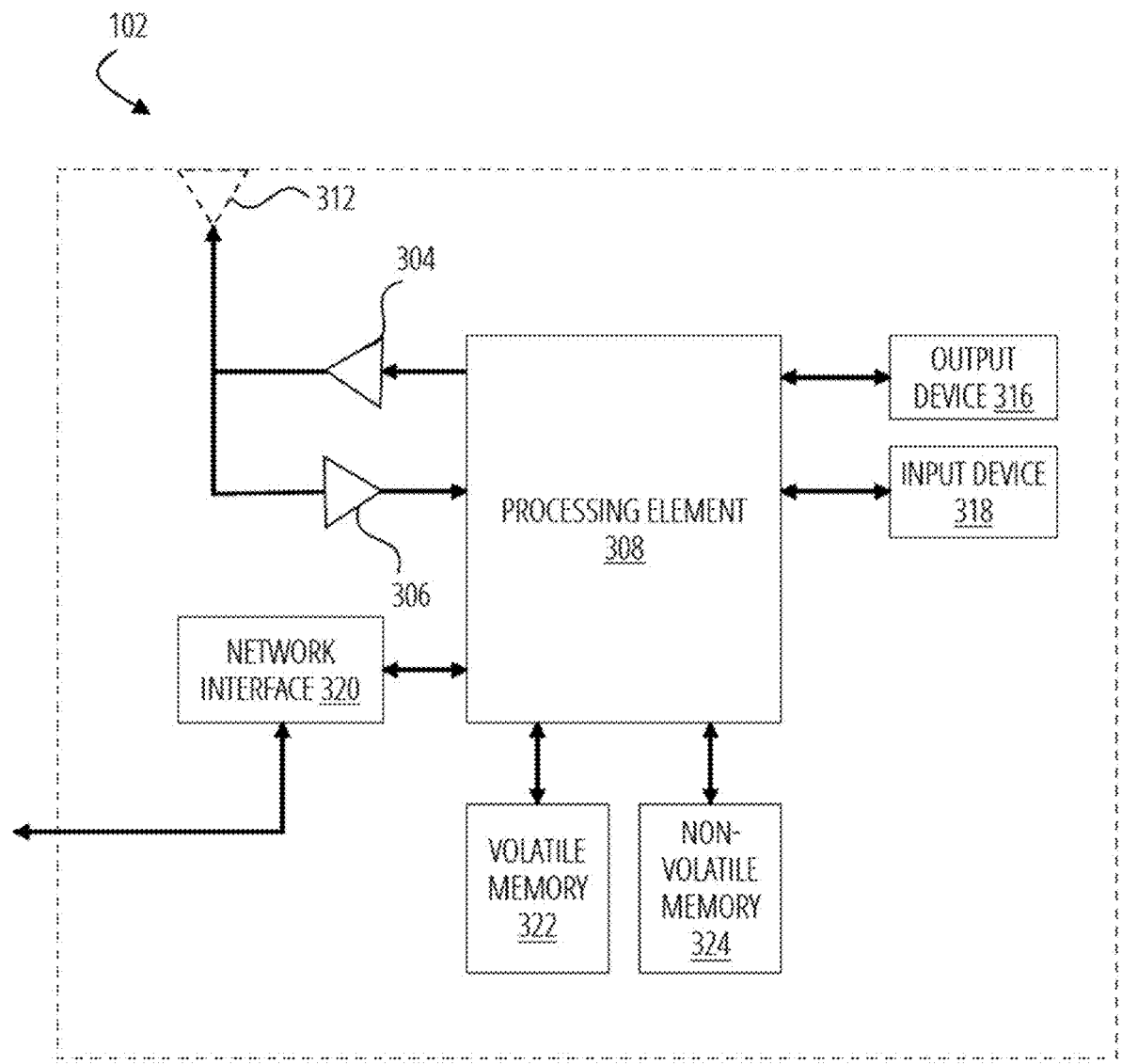
FIG. 3 provides an example client computing entity in accordance with one or more embodiments of the present disclosure.

FIG. 3 provides an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the computing entity 200. In some embodiments, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the computing entity 200 via a network interface 320.

Via these communication standards and protocols, the client computing entity 102 may communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download code, changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface (that may include an output device 316 (e.g., display, speaker, tactile instrument, etc.) coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the computing entity 200, as described herein. The user input interface may comprise any of a plurality of input devices 318 (or interfaces) allowing the client computing entity 102 to receive code and/or data, such as a keypad (hard or soft), a touch display, voice/speech or motion interfaces, or other input device. In some embodiments including a keypad, the keypad may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory may store databases, database instances, database management systems, data, applications, programs, program modules, scripts, code (source code, object code, byte code, compiled code, interpreted code, machine code, etc.) that embodies one or more machine learning models or other computer functions described herein, executable instructions, and/or the like to implement the functions of the client computing entity 102. As indicated, this may include a user application that is resident on the client computing entity 102 or accessible through a browser or other user interface for communicating with the computing entity 200 and/or various other computing entities.

In another embodiment, the client computing entity 102 may include one or more components or functionalities that are the same or similar to those of the computing entity 200, as described in greater detail above. In one such embodiment, the client computing entity 102 downloads, e.g., via network interface 320, code embodying machine learning model(s) from the computing entity 200 so that the client computing entity 102 may run a local instance of the machine learning model(s). As will be recognized, these architectures and descriptions are provided for example purposes only and are not limited to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. Examples of Certain Terms

In some embodiments, the term "input structured data object" refers to a data entity that is provided to a platform for ingestion by an external party. An input structured data object may describe a plurality of attributes for a plurality of entities associated with the external party. For example, an input structured data object may include a data storage structures, such as a data file, etc. that defines a plurality of attributes and their associations with a plurality of entities. The data storage structure, for example, may encode one or more one or more linked lists, databases (e.g., relational databases, graph database, etc.), data tables, and/or the like. By way of example, an input structured data object may include an Excel® file (e.g., data encoded as an xls format, etc.), an extensible Markup Language file (e.g., data encoded as an XML format, etc.), and/or the like.

In some embodiments, an input structured data object includes a plurality of input data elements that are arranged in accordance with an input data format. Each of the input data elements, for example, may describe an attribute of an entity associated with an external party. The placement of the input data element in accordance with the input data format may identify a correspondence between a particular attribute (e.g., a numerical value, text, binary indicator, etc.), an entity, and a data type. By way of example, an input structured data object may define a table, roster, and/or the like, that includes a plurality of data elements arranged within a plurality of columns and rows. In some examples, the coordinates of a data element (e.g., a column and row identifier) may identify a data type of the data element (e.g., via a column identifier, etc.) and an entity that corresponds to the data element (e.g., via a row identifier).

In some embodiments, an input structured data object is generated by an external party to record new, modified, and/or removed attributes for a plurality of data entities associated with the external party. The input structured data object may then be provided to a platform to ingest the new, modified, and/or removed attributes as recorded by the input structured data object. As described herein, an input structured data object may be defined by a target data format and/or an input data format that is different than the target data format. For example, an external entity may record new, modified, and/or removed attributes for associated data entities as data elements of particular data types that are recognized by the external party, but not the ingesting platform. In order to accurately ingest new, modified, and/or removed attributes from an input structured data object, the input data types defined by an input data format may be mapped to target data types recognized by the platform. However, this is a time and processing resource intensive process that is subject to numerous technical challenges. These challenges grow exponentially with the size and complexity of an input structured data object. Some techniques of the present disclosure are designed to address these technical challenges to allow for the ingestion of input structured data objects from a plurality (e.g., 700+, etc.) of external parties with differing input data formats of various sets of locally defined data types (e.g., 100+, etc.). By way of example, each input structured data object may include data elements associated with over a hundred and twenty different data types that may or may not correspond with target data types recognized by an ingesting platform.

In some embodiments, the term "data entity" refers to an identifier that describes a set of recorded attributes for a particular entity. A data entity, for example, may include a grouping mechanism for assigning a plurality of attributes to single entity. The entity may depend on the domain. As one example, for a clinical domain that handles a plurality of clinical provider rosters, a data entity may represent a healthcare provider, organization, and/or the like.

In some embodiments, the term "data element" refers to an attribute for a particular data entity. A data element, for example, may include a data value that describes an attribute of a particular type for a data entity. For instance, a data element may include a numeric, alpha-numeric, textual, value and/or the like. In some examples, a data element may include metadata and/or the like that describe a data type and/or one or more data entities that are associated with the data element. A data element may depend on a domain and/or one or more data types of a domain. As one example, for a clinical domain that handles a plurality of clinical provider rosters, a data element may represent at least a portion of a healthcare provider's name (e.g., last, middle, first, etc.), address, workplace, certifications, workhours, and/or the like.

In some embodiments, the term "data type" refers to an identifier that describes a type and/or one or more common characteristics of a data element. A data type, for example, may describe metadata associated with a data element of a particular type. By way of example, a data type may define a particular data format (e.g., binary, string, etc.), a type label (e.g., a field name, etc.), one or more associated types, and/or the like for a data element of a particular type. A data type may depend on the domain. As one example, for a clinical domain that handles a plurality of clinical provider rosters, a data type may define an address type for address data elements, a provider name type for name data elements, an hour type for workhour data elements, and/or like.

In some examples, a data element may be recorded using one or more different, correlating data types. For example, in a multi-party domain, a platform may record a plurality of data elements using a plurality of target data types in accordance with a target data format that is defined by the platform. One or more of the same data elements may be recorded by an external party using a plurality of input data types in accordance with an input data format that is defined by the respective external party. In some examples, data elements across different data types may be converted to a single data type to aggregate data from multiple external parties.

In some embodiments, the term "data format" refers to a data structure definition that defines a plurality of data types. A data format, for example, may include a sequence of data types (e.g., a sequence of column or rows in a table, etc.) that is defined by a platform and/or external party, respectively, to record data for one or more associated data entities. A data format, for example, may define a plurality of party-specific data types and/or an arrangement (e.g., a sequential ordering, etc.) of the party-specific data types. As described herein, a party (e.g., the platform, an external party, etc.) may generate a structured data object by recording a plurality of attributes for one or more associated entities as a plurality of data elements in accordance with a particular data format.

In some embodiments, the term "input data format" refers to a data format that is defined, leveraged, and/or otherwise associated with an external party that is configured to provide an input structured data object to a platform for ingestion. An input structured data object may be defined in accordance with an input data format. By way of example, an external party may generate and/or modify an input structured data object by generating, adding, and/or removing input data elements to the input structured data object in accordance with the input data format. Each of the input data elements may be defined as a particular input data type of a input data format In some embodiments, the term "input data type" refers to a data type of an input data format. An input data type, for example, may include a data type that is defined by an external party. In some examples, an input data type may correspond to a target data type defined by a platform. For instance, an input data type may be leveraged by an external party to record a data element that is interpreted by the platform using a different target data type. The input data type, for example, may include different metadata (e.g., a different type label, etc.) than a target data type, while recording the same type of underlying data.

In some embodiments, the term "target data type" refers to a data type of a target data format. A target data type, for example, may include a standardized data type that is defined and recognized by a platform. In some examples, a target data type may be leveraged, by the platform, to aggregate data elements of various different input data types into a single standardized format. In some examples, a target data type may be associated with one or more task-specific data constraints. For instance, a target data type may include one or more requirement flags indicating whether a data element of a particular target data type is required for a particular task. By way of example, a requirement flag may indicate that a data element for a particular target data type is required for ingesting information of a new data entity to a platform data store. Other requirement flags may indicate that a data element for a particular target data type is required for a particular downstream process, such as one or more machine leaning, statistical, compliance, and/or the like, operations.

In some embodiments, the term "target data format" refers to a data format that is defined, leveraged, and/or otherwise associated with a platform that is configured to ingest, aggregate, and/or otherwise use data originating from a plurality of external parties. A platform, for example, may include platform data store that may store, arrange, and/or reference a plurality of data elements using a plurality of target data types defined by a target data format.

In some embodiments, the term "historical mapped format data object" refers to a data structure that describes an input data object that is previously mapped to a target data format. For example, a historical mapped format data object may include a historical data format and a plurality of historical type matches between the historical data types of the historical data format and a plurality of target data types.

In some examples, a historical mapped format data object may include a plurality of historical data elements that respectively correspond to the historical data types of the historical data format. By way of example, the historical data elements may include a plurality of input data elements from one or more input structured data objects that are associated with the historical data format and previously ingested by a platform.

In some embodiments, a plurality of historical mapped format data objects is stored in a training data store. For instance, a crosswalk database may be implemented using historical submission patterns of external parties associated with a platform to maintain a log of a plurality of structured input data objects from a plurality of different external parties. In some examples, a new structured input data object may be compared to the training data store to leverage previously mapped input data objects for mapping the new structured input data object without the need for additional user interaction. The saved mappings (e.g., historical mapped format data objects, etc.), for example, may be used in reference for subsequent submissions of the same input data format.

In some embodiments, the term "historical data format" refers to an input data format that is previously received and/or ingested by a platform.

In some embodiments, the term "historical data type" refers to a mapped data type of a historical data format.

In some embodiments, the term "historical data element" refers to a data element that is previously received and/or ingested by a platform.

In some embodiments, the term "historical type match" refers to an identifier that describes a correspondence between a historical data type and a target data type. A historical type match, for example, may include a link, a reference, and/or the like that defines a type pair, including a historical data type and a corresponding target data type.

In some embodiments, the term "format inconsistency error" refers to an identifier that describes an inconsistency between an input data format, a target data format, and a plurality of historical mapped format data objects of a training data store. A format inconsistency error, for example, may indicative that an input data format of a structured input data object is a new, previously unrecorded, data format.

In some embodiments, a platform processes a structured input data object to identify a format inconsistency error before ingesting the data element of the structured input data object. For instance, if a structured input data object is defined in a target data format, then a format inconsistency error will not be triggered and all the data elements of the structured input data object may be ingested and/or processed for one or more downstream tasks (e.g., deriving change types requested, data validations and standardizations, validation rules, etc.). If the structured input data object is defined by an input data format that is different than the target data format, the platform may compare the structured input data object to the plurality of historical data objects to determine a match and, in the event there is no match, the platform may trigger a format inconsistency error. In some examples, a format inconsistency error may trigger a plurality of predictive data matching operations, as described herein.

In some embodiments, the term "predictive machine learning model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A predictive machine learning model may include any type of model configured, trained, and/or the like to determine a likelihood of a match between two data types, as described herein. A predictive machine learning model may include one or more of any type of machine learning model including one or more supervised, unsupervised, semi-supervised, and/or reinforcement learning models. In some embodiments, a predictive machine learning model may include multiple models configured to perform one or more different stages of a data matching process.

In some embodiments, a predictive machine learning model includes a neural network architecture that is trained using one or more supervised and/or reinforcement learning techniques. By way of example, a predictive machine learning model may be initially trained using one or more supervisory training techniques (e.g., back propagation of errors, gradient descent optimization, etc.) and a labelled training dataset. In some examples, the predictive machine learning model may be continuously finetuned (e.g., retrained, etc.) using one or more reinforcement training techniques (e.g., back propagation of errors, agent-led learning, etc.) and historical data representative, such as historical mapped format data objects. By way of example, a predictive machine learning model may include pretrained machine learning service that is trained to identify proposed type matches between two data types. The type matches, for example, may be derived from domain logic and/or a plurality of predictive features that identify relevant element clusters. The predictive features may be partially predefined (e.g., during an initial training stage) and partially learned (e.g., during a reinforcement training stage) to adapt the predictive machine learning model over time.

In some examples, a predictive machine learning model may be used to identify one or more target data types for an input data type. For example, a predictive machine learning model may be trained for a target data format using a labelled training set with a plurality of training entries, each including a training data element of a training data type and a corresponding ground truth target data type. The predictive machine learning model may be continuously refined based on user input by providing an explainable artificial intelligence-based mapping confirmation loop. The confirmation loop, for example, may provide a user with an opportunity to review and providing user input for a type match (and/or match score thereof) output by the a predictive machine learning model. The user input provided by the user may be used as a ground truth for finetuning the predictive machine learning model.

By way of example, before applying a predictive machine learning model, a labelled training dataset may be preprocessed to identify a plurality of predefined features for each of a plurality of target data types. The plurality of predefined features, for example, may be identified from a plurality training entries associated with each of the plurality of target data types. The predictive machine learning model may be tuned with custom hyper parameters to increase model performance (e.g., an F1 score 94%, etc.) within increasing model size (e.g., 6 MB, etc.). Reinforcement learning may be continuously applied to continuously adapt the predictive machine learning model to data elements as they change over time.

In some embodiments, the term "match score" refers to a data value that describes a likelihood (e.g., probability, percentage, etc.) of a type match between an input data type and a target data type. A match score, for example, may include real number, percentage, ratio, and/or any other likelihood representation. In some examples, a type match may be identified based on a match score. For instance, a type match may be identified in response to a match score that achieves a tunable threshold (e.g., 0.5, 0.9, etc.).

In some embodiments, the term "labeled training dataset" refers to a data structure that describes a plurality of training entries for a target data format. An example labeled training dataset may include any type (and any number) of data storage structures including, as examples, one or more linked lists, databases (e.g., relational databases, graph database, etc.), and/or the like. In some embodiments, a labeled training dataset may include a plurality of training entries, each reflective of a data element and a target data type label for the data element. The ground truth label, for example, may identify a target data type that corresponds to the data element.

In some embodiments, the term "target data type label" refers to an identifier the describes a target data type for a training entry. A target data type label may be manually assigned and/or automatically assigned to a data element. For example, a target data type label may include a manual label for a data element that is associated with a target data format. In addition, or alternatively, a target data type label may be assigned based on an input type match, as described herein.

In some embodiments, the term "predictive feature" refers to a characteristic of a data element that is predictive of a data type. A predictive feature, for example, may describe a numerical value range, a text string length, a semantic characteristic, a value format, and/or the like that is at least partially shared by a plurality pf data elements of a particular data type.

In some embodiments, the term "predictive mapped format data object" refers to a data structure that describes a mapping between an input data object and a target data format. For example, a predictive mapped format data object may include an input data format and a plurality of input type matches between the input data types of the input data format and the plurality of target data types. In some examples, an input mapped format data object may include a plurality of input data elements of the input structured data object and a plurality of input type matches correlating the input data elements to corresponding target data types.

In some embodiments, a predictive mapped format data object, and/or one or more input type matches thereof, is provided to a user to validate the one or more input type matches. In the event of a confirmation input, a predictive mapped format data object may be stored in a training data store as a historical mapped format data object.

In some embodiments, the term "input type match" refers to an identifier that describes a correspondence between an input data type and a target data type. An input type match, for example, may include a link, a reference, and/or the like that defines a type pair, including an input data type and a corresponding target data type. In some examples, an input type match may include a single target data type for a particular input data type. In addition, or alternatively, an input type match may include one or more target data types for a particular input data type.

In some embodiments, the term "validation user interface" refers a GUI and/or associate GUI wizard (e.g., executable code configured to control a functionality of GUI) that provides one or more interactive interface screens, representations, and/or widgets for interacting with a user. A validation user interface, for example, may be configured to provide for display, to a user, data matching information, such as type matches between one or more different data types. The data matching information may be arranged relative to interactive widgets to enable user input with respect to the data matching information. The interactive widgets, for example, may enable a confirmation, modification, and/or denial of a type match represented by the data matching information. In this manner, a validation user interface may provide a single interface between a user and a platform that enables a user to selectively a contribute to a data ingestion process performed by the platform.

A validation user interface may be specially configured to reduce the time, burden, and processing resources traditionally expended to ingest data from an input data format. To do so, a validation user interface may arrange an interactive validation representation relative to a plurality of prepopulated target data type representations and corresponding interactive input selection widgets. The interactive validation representation, the target data type representations, and/or the interactive input selection widgets may be arranged to accommodate small screen sizes, such as mobile devices, laptops, etc., without reducing the efficacy of a reviewing process. For example, input data types may be extracted from large input data formats and individually (or in small subsets) prepopulated within interactive input selection widgets positioned relative to each of a plurality of target data type representations respectively corresponding to a plurality of target data types of a target data format. In some examples, the target data type representations, and their corresponding interactive input selection widgets, may be arranged in a list format to allow a user to scroll through a traditional tabular representation. This, in turn, allows the performance of traditionally complex data matching operations from a client device with small formfactors.

In some embodiments, the term "interactive validation representation" refers to an interface screen that describes a predictive mapped format data object. An interactive validation representation may include a target data type representation for each of a plurality of target data types (and/or a subset thereof). In addition, or alternatively, an interactive validation representation may include an interactive input selection widget for each of the plurality of target data types (and/or a subset thereof). In some examples, an interactive validation representation may include an input data format representation that describes an overview of an input data format. The input data format representation, for example, may include a listing of input data types extracted from the input data format. In some examples, the input data format representation may describe a status for each of the input data types, such as an "assigned" status indicating that an input data type is assigned to a target data type, an "unassigned" status indicating that an input data type is not assigned to a target data type, and/or the like.

In some embodiments, the term "target data type representation" refers to an element of an interactive validation representation. A target data type representation, for example, may include a static representation of a target data type. For instance, a target data type representation may include a text string positioned within the interactive validation representation and reflecting a particular target data type.

In some embodiments, the term "interactive input selection widget" refers to an element of an interactive validation representation. An interactive input selection widget, for example, may include a dynamic representation of an input data type that corresponds to a target data type. For instance, an interactive input selection widget may be positioned within the interactive validation representation at a position adjacent to a corresponding target data type representation.

In some examples, an interactive input selection widget may include one or more text strings that reflect an input data type for a target data type. In some examples, an interactive input selection widget may include a dropdown box and/or other selection mechanism with one or more text strings reflective of one or more input data types for a target data type. In some examples, an interactive input selection widget is prepopulated, using one or more techniques of the present disclosure, to identify one or more input data types for one or more of a plurality of target data types.

In some embodiments, the term "confirmation input" refers to user input to an interactive user interface. A confirmation input may include any type of user input, including verbal (e.g., verbal commands to a microphone, etc.), text (e.g., text input to a text box, etc.), selection (e.g., a selection from a dropdown, etc.), and/or any other type of input. A confirmation input may describe a verification, a modification, and/or a denial of an input type match between an input data type and a target data type. In some examples, a confirmation input may describe a verification, a modification, and/or a denial of a subset of input type matches from a predictive mapped format data object. In addition, or alternatively, a confirmation input may describe a verification, a modification, and/or a denial of each of the input type matches from a predictive mapped format data object. In some examples, once a confirmed mapping is received from a user, a platform may store that mapping for future use and for machine learning training for enhancing predictions, as described herein.

In some embodiments, the term "converted input structured data object" refers to a data structure that describes a structured input data object that is mapped from an input data format to a target data format. For instance, a converted input structured data object may include a plurality of converted data elements that are remapped from the structured input data object to a target data format in accordance with a plurality of confirmed input type matches. In this manner, data elements from a structured input data object may be automatically converted to a standardized data format at ingestion.

In some embodiments, one or more target data types are associated with one or more value formatting rules, such as a mailing formats, hourly formats, specialty coding formatting, and/or the like. In some examples, the plurality of converted data elements that correspond to the one or more target data types may be processed to apply conform with the one or more value formatting rules.

In some examples, a converted input structured data object may arrange each of the plurality of converted data elements with reference to a particular data entity to ensure that attributed for each data entity are extracted as a whole making sure the most clear and concise information is provided to downstream systems to make automated updates. For example, a structured input data object may include a table with multiple rows across a plurality of add, term, and/or change tabs. In some examples, each row is extracted, validated, translated, and normalized to standard formats (e.g., address, Office hours, specialty, and degree codes, etc.). In the event of a fallout error, all rows may be provided back to a user to perform a fallout error review. In the absence of an error, the rows may be published for downstream systems consumption.

In some embodiments, the term "fallout error" refers to an identifier that describe an ingestion error for a data element of a structured input data object. In some examples, a fallout error may be leveraged to establish a secondary feedback loop by publishing error codes/types and descriptions back to a user when a data element fails data validation due to being unfit for downstream processing. A fallout error may be generated and communicated for a particular data element and/or a data entity to provide user facing friendly messages that are data element specific. Example fallout errors may include an absence of a required target field (e.g., based on one or more requirement flags, etc.), an external party integrity flag, a regular filed validation flag, a complex validation flag, a generic error code, and/or the like.

A user may override and/or address a fallout error to enable an ingestion of a structure input data object. In some examples, the fallout errors may be leveraged to further finetune the predictive machine learning model.

In some embodiments, the term "first party" refers to a computing entity that is associated with a data processing pipeline. The first party may include a computing system, platform, and/or device that is configured to digest, process, cleanse, format, and/or leverage data from one or more third-party data sources. For example, the first party may include a first-party platform that is configured to digest, process, cleanse, format, and/or leverage data from one or more disparate data sources to perform a computing action. In some embodiments, the data from the one or more disparate data sources may be accessible to the first party via a network. In some embodiments, the computing action may include machine learning, data filtering, and/or generating a validation user interface associated with the data. For example, the first-party platform may include a machine learning processing platform configured to facilitate the performance of one or machine learning models, a data processing platform configured to process, monitor, and/or aggregate large datasets, a user interface platform configured to initiate a rendering of a validation user interface associated with the data, and/or the like. To improve computing efficiency and enable the aggregation of data across multiple disparate datasets, the first party may utilize one or more first-party data ingestion protocols to generate a defined data object related to the data. For example, the first party may transform third-party data elements from one or more third-party data sources to a defined first-party format to facilitate the machine learning models, data processing, and/or rendering of data associated with the first-party platform. In some examples, the first party may utilize application programming interfaces (APIs) to ingest the data from one or more third-party data sources.

In some embodiments, the term "third-party data source" refers to a data storage entity configured to store, maintain, and/or monitor a data catalog. A third-party data source may include a heterogenous data store that is configured to store a data catalog using specific database technologies. A data store, for example, may include a data repository, such a database, and/or the like, for persistently storing and managing collections of structured and/or unstructured data (e.g., catalogs, etc.). A third-party data source may include an on-premises data store including one or more locally curated data catalogs. In addition, or alternatively, a third-party data source may include a remote data store including one or more cloud-based data lakes. In some examples, a third-party data source may be built on specific database technologies that may be incompatible with one or more other third-party data sources. Each of the third-party data sources may define a data catalog that, in some use cases, may include data segments that could be aggregated to perform a computing task. In some embodiments, a third-party data source may be a health data source. For example, a third-party data source may be an electronic health record data source. In some embodiments, data from a third-party data source may be stored in a particular data format such as, for example, JSON, XML, FIHR, PDF, and/or another type of data format. In some embodiments, data from a third-party data source may include collection of text data. For example, one or more portions of data from a third-party data source may correspond to a medical record. A medical record may contain information for claim lines in a case. A portion of a medical record for a particular claim line may be one paragraph or a set of keywords in the medical record.

IV. Overview

Various embodiments of the present disclosure provide data processing and/or machine learning techniques that improve upon traditional data processing engines and/or traditional data processing techniques. To do so, some embodiments of the present disclosure provide an intelligent data processing pipeline that utilizes machine learning to cleanse and/or format data received from one or more data sources. In some embodiments of the present disclosure, the data may be intelligently formatted for a particular data processing task such as, for example, a machine learning task or an API task for an electronic interface. For example, the resulting formatted data may be provided with improved quality for one or more downstream systems associated with one or more data processing tasks. This, in turn, enables an improved data processing pipeline and, in some embodiments, an improved machine learning pipeline that directly addresses technical challenges within the realm of traditional data processing engines and/or traditional data processing techniques, such as inaccurate formatting of data, time-consuming ingestion of data, resource intensive transformation of data, and/or inaccurate datasets for data processing tasks, among others.

To ensure a uniform and/or properly formatted data object for one or more data processing tasks, some embodiments of the present disclosure provide a machine learning process that leverages a predictive machine learning model to directly tailor formatting, cleansing, and/or task-specific requirements for one or more structured data objects. As described herein, the specific data processing and machine learning techniques leveraged for generating predictive mapped format data objects enable a computer to perform a particular computing task that is traditionally unachievable and/or error prone using traditional data processing engines and/or traditional data processing techniques. In this manner, one or more predictive mapped format data objects may be generated using predictive machine learning modeling and/or validation user interfaces engineered for specific data mapping tasks such that the one or more predictive mapped format data objects may be automatically formatted for improved quality and/or accuracy for one or more downstream systems associated with one or more other data processing tasks. This, in turn, enables an improved data processing pipeline that directly addresses technical challenges within the realm of traditional data processing engines and/or traditional data processing techniques, such as inaccurate formatting of data, time-consuming ingestion of data, resource intensive transformation of data, and/or inaccurate datasets for data processing tasks, among others.

In a non-limiting example related to a healthcare technology domain, various embodiments disclosed herein provide an improvement to traditional management of patient information stored in electronic health records. For example, traditional data processing engines of a healthcare computing system typically encounter several challenges for formatting patient information from electronic health records for a particular data processing task where the vast amount of data is present in different data formats (e.g., structured forms, PDFs or images from lab reports, long free-text notes, etc.). To add to the data format complexity for the data processing engine, health data for a patient is often fragmented over various systems and/or data sources. Various embodiments disclosed herein therefore address the technical problems of aggregating and/or formatting fragmented data from various data sources to provide a predictive mapped format data object for patient information. Various embodiments disclosed herein additionally address the technical problems of aggregating and/or formatting medical information from different data formats to provide a predictive mapped format data object for medical information. With the data processing pipeline disclosed herein that utilizes machine learning to ingest, aggregate, cleanse, format, manage, and/or transform data from data sources, intelligent data processing of medical information may be provided to improve patient assessment and care provision.

Examples of technologically advantageous embodiments of the present disclosure include: (i) data processing techniques such as, for example, data pre-processing techniques for improving data formatting of input data for a downstream data processing task, (ii) machine learning techniques for optimizing a data object for a downstream data processing task, (iii) improved machine learning models, and training techniques thereof, for mapping data elements of a data structure into a data mapping, (iv) and improved user interfaces for validating output provided by machine learning models, among other aspects of the present disclosure. Other technical improvements and advantages may be realized by one of ordinary skill in the art.

V. Example System Operations

As indicated, various embodiments of the present disclosure make important technical contributions to data processing and/or machine learning techniques. In particular, systems and methods are disclosed herein that implement machine learning techniques to improve data processing performance with respect to formatting and/or cleansing data for particular computing tasks. By doing so, quality of data objects for particular computing tasks may be improved to expand the applicability of data processing techniques to task-specific use cases. In some embodiments, the use of machine learning models may be configured for optimized data processing that is traditionally outside the scope of such models therefore resulting in an improvement to machine learning that is practically applied herein to address technical challenges with formatting and/or cleansing data obtained from different data sources. In some embodiments, the use of machine learning models may be configured to improved input data provided to downstream machine learning models and/or other downstream data processing.

Figure 4:
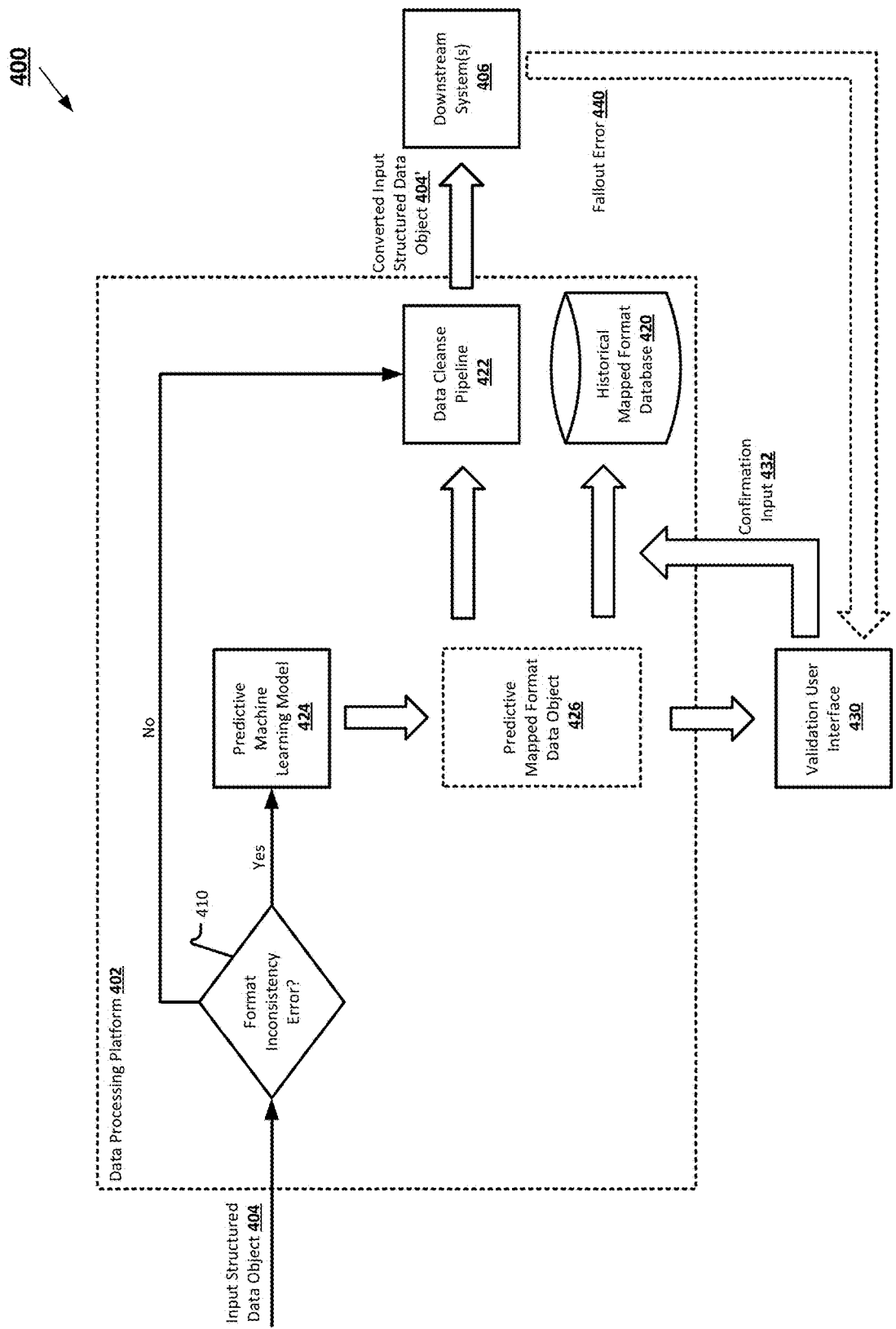
FIG. 4 is a dataflow diagram showing example data structures, modules, and/or pipelines for providing predictive mapped formatting for data in accordance with one or more embodiments discussed herein.

FIG. 4 is a dataflow diagram 400 showing example data structures, modules, and/or pipelines for providing predictive mapped formatting for data in accordance with some embodiments discussed herein. In some embodiments, the dataflow diagram 400 provides predictive mapped formatting for data related to a format inconsistency error via machine learning. The dataflow diagram 400 includes a data processing platform 402. The data processing platform 402 may process an input structured data object 404. In some embodiments, the data processing platform 402 may process the input structured data object 404 for one or more downstream systems 406.

The input structured data object 404 may include a plurality of input data elements that are structured according to an input data format. In some embodiments, the input structured data object 404 may be received from one or more third-party data sources. In some embodiments, the one or more third-party data sources are configured as one or more electronic health record data source. The one or more third-party data sources may store the plurality of input data elements. In some embodiments, an input data element of the plurality of input data elements may correspond to text and/or one or more images. In some embodiments, an input data element of the plurality of input data elements may be configured in a particular data format such as, for example, PDF, JSON, XML, FHIR, JPEG, DICOM, PNG, TIFF, BMP, and/or another type of data format. In some embodiments, n input data element of the plurality of input data elements may correspond to at least a portion of a lab report, a clinical note, a medical form, or another type of electronic health record.

The data processing platform 402 is configured to perform one or more data processing techniques with respect to the input structured data object 404 by using the computing system 101. In some embodiments, the data processing platform 402 determines whether format inconsistency error is associated with the input structured data object 404 via at step 410 of the data processing platform 402. For example, the computing system 101 may identify a format inconsistency error for the input structured data object 404 based on a comparison between the input data format of the input structured data object 404 and a plurality of historical mapped format data objects stored in a historical mapped format database 420. In some embodiments, the input data format for the input structured data object 404 defines a plurality of input data types. A historical mapped format data object of the plurality of historical mapped format data objects may include a historical data format that defines a plurality of historical data types. Additionally or alternatively, a historical mapped format data object of the plurality of historical mapped format data objects may include one or more historical type matches that respectively identify one or more first target data types respectively corresponding to one or more historical data types of the plurality of historical data types.

In response to determining that a format inconsistency error does not exist for the input structured data object 404, the data processing platform 402 may perform one or more steps of a data cleanse pipeline 422 with respect to the input structured data object 404. Alternatively, in response to identifying the format inconsistency error, the data processing platform 402 may utilize a predictive machine learning model 424 to generate a predictive mapped format data object 426 for the input structured data object 404. In some embodiments, the predictive machine learning model 424 is integrated within the data processing platform 402. In some embodiments, the format inconsistency error is identified based on a comparison between the plurality of input data types and the plurality of historical data types. In some embodiments, the predictive machine learning model 424 is an external model that is communicatively coupled to the data processing platform 402. In some embodiments, the predictive machine learning model 424 includes a neural network architecture that is pretrained using a labeled training dataset. In some embodiments, the predictive machine learning model 424 is finetuned using the plurality of historical mapped format data objects. In some embodiments, the labeled training dataset includes a plurality of labeled data elements. In some embodiments, each of the plurality of labeled data elements includes a target data type label and/or a training data element reflective of one or more predictive features of the plurality of predictive features.

In some embodiments, a historical mapped format data object of the plurality of historical mapped format data objects includes a historical data format that defines a plurality of historical data types. In some embodiments, a historical mapped format data object of the plurality of historical mapped format data objects additionally or alternatively includes a historical type match that identifies a target data type corresponding to a historical data type of the plurality of historical data types. In some embodiments, a historical mapped format data object of the plurality of historical mapped format data objects additionally or alternatively includes a plurality of historical data elements that correspond to the historical data type. In some embodiments, the target data type is used as a target data type label for each of the plurality of historical data elements. In some embodiments, the predictive machine learning model 424 is trained, using one or more reinforcement training techniques, to learn one or more of the plurality of predictive features that correspond to the target data type based on the plurality of historical data elements.

In some embodiments, in response to identifying the format inconsistency error, the computing system 101 generates, by using the predictive machine learning model 424, the predictive mapped format data object 426 for the input data format. In some embodiments, the predictive mapped format data object 426 is generated based on the plurality of input data elements of the input structured data object 404 and a plurality of predictive features associated with the plurality of historical mapped format data objects. In some embodiments, the predictive mapped format data object 426 includes the input data format. Additionally or alternatively, in some embodiments, the predictive mapped format data object 426 includes one or more input type matches that respectively identify one or more second target data types that respectively correspond to one or more input data types of the plurality of input data types.

In some embodiments, in response to identifying the format inconsistency error, the computing system 101 additionally or alternatively initiates a presentation of a validation user interface 430 that reflects the predictive mapped format data object 426. The validation user interface 430 may be a GUI and/or associated GUI wizard that provides one or more interactive interface screens, representations, and/or widgets for interacting with a user via the client computing entity 102. In some embodiments, the validation user interface 430 may be configured to receive confirmation input with respect to validation of the predictive mapped format data object 426 provided by the predictive machine learning model 424. In some embodiments, the validation user interface 430 may be configured to receive one or more modifications and/or augmentations with respect to validation of the predictive mapped format data object 426 provided by the predictive machine learning model 424.

In some embodiments, an interactive validation representation is provided via the validation user interface 430. In some embodiments, the input data format defines a plurality of input data types and the predictive mapped format data object includes an input type match that identifies a target data type corresponding to an input data type of the plurality of input data types. Additionally, in some embodiments, the interactive validation representation includes a plurality of target data type representations respectively corresponding to a plurality of target data types. In some embodiments, the interactive validation representation additionally includes a plurality of interactive input selection widgets respectively corresponding to the plurality of target data type representations. In some embodiments, an interactive input selection widget of the plurality of interactive input selection widgets that corresponds to the target data type with the input data type is repopulated. In some embodiments, the interactive input selection widget may be repopulated based on one or more interactions with respect wo the validation user interface 430. Additionally or alternatively, the interactive input selection widget may be repopulated based on output of the predictive machine learning model 424.

In some embodiments, the input type match is based on one or more match scores respectively corresponding to one or more target data types of the plurality of target data types. In some embodiments, the interactive input selection widget may be repopulated by selecting the target data type from the one or more target data types based on the one or more match scores. In some embodiments, the interactive input selection widget that corresponds to the target data type is repopulated based on the selection of the target data type.

In some embodiments, the predictive mapped format data object comprises one or more input type matches for each of the plurality of target data types. In some embodiments, the interactive input selection widget may be repopulated by identifying at least two input data types that correspond to the target data type based on the one or more input type matches for each of the plurality of target data types. In some embodiments, in response to identifying the at least two input data types, a dropdown selection widget of the interactive input selection widget may be repopulated with the at least two input data types. Additionally or alternatively, in some embodiments in response to identifying the at least two input data types, a flag may be assigned to a target data type representation of the plurality of target data type representations that corresponds to the target data type.

In some embodiments, in response to a confirmation input 432 to the validation user interface 430, the data processing platform 402 may store the predictive mapped format data object 426 in the historical mapped format database 420. For example, in response to a confirmation input 432 to the validation user interface 430, the computing system 101 may store the predictive mapped format data object 426 as a historical mapped format data object of the plurality of historical mapped format data objects associated with the historical mapped format database 420. In some the confirmation input 432 may be indicative of a particular interaction with respect to the interactive validation representation of the validation user interface 430. In some the confirmation input 432 may be indicative of a particular interaction with respect to an interactive input selection widget. In some the confirmation input 432 may be indicative of a selection of a particular input data type from a dropdown selection widget.

Additionally or alternatively, in response to a confirmation input 432 to the validation user interface 430, the data processing platform 402 may provide the predictive mapped format data object 426 as input to the data cleanse pipeline 422. The data cleanse pipeline 422 may perform one or more data cleaning techniques with respect to the input structured data object 404 and/or the predictive mapped format data object 426. For example, the data cleanse pipeline 422 may include removing duplicate input data elements, augmenting input data elements, standardizing input data elements, extracting features from input data elements, validating input data elements, and/or one or more other data cleansing techniques for a particular data processing task associated with the one or more downstream systems 406.

In some embodiments, the predictive mapped format data object 426 includes a plurality of input type matches that identify an input data type for each of a plurality of target data types defined by a target data format for the one or more downstream systems 406. In some embodiments, the confirmation input 432 is indicative of a confirmation of the plurality of input type matches. In some embodiments, the data cleanse pipeline 422 may generate, using the predictive mapped format data object 426, a converted input structured data object 404' by converting the plurality of input data elements of the input structured data object 404 from the input data format to the target data format. In some embodiments, the converted input structured data object 404' may be configured in a particular data format such as, but not limited to, FHIR, HL7, DICOM, EDI, a copybook format, a fixed file format, and/or another type of data format. In some embodiments, the converted input structured data object 404' is ingested into the one or more downstream systems 406.

In some embodiments, the data cleanse pipeline 422 may filter the input structured data object 404 and/or the predictive mapped format data object 426 based on domain knowledge information. In some embodiments, the domain knowledge information may include a set of domain keywords and/or other data related to domain knowledge for a defined domain task. In some embodiments, the domain knowledge information may be clinical knowledge information related to a particular clinical domain. In some embodiments, the data cleanse pipeline 422 may filter the input structured data object 404 and/or the predictive mapped format data object 426 to further improve quality of the data in the input structured data object 404 and/or the predictive mapped format data object 426 for the defined domain task. For example, the data cleanse pipeline 422 may filter the input structured data object 404 and/or the predictive mapped format data object 426 based on a set of data quality rules and/or set of duplication rules.

In some embodiments, the particular data processing task associated with the one or more downstream systems 406 includes a machine learning task. In some embodiments, the particular data processing task associated with the one or more downstream systems 406 includes an API task. In some embodiments, the particular data processing task associated with the one or more downstream systems 406 includes a user interface task for rendering visual data associated with the input structured data object 404.

In some embodiments, the one or more downstream system 406 may perform one or more additional machine learning processes with respect to the input structured data object 404 and/or the predictive mapped format data object 426 to generate a modified data object for a defined domain task. In some embodiments, the defined domain task corresponds to a condition of interest (e.g., a medical condition of interest) for a patient. In some embodiments, the defined domain task corresponds to a medical prediction for a patient. In some embodiments, the one or more downstream system 406 may generate a visualization for a user interface. For example, the visualization may be based on the input structured data object 404 and/or the predictive mapped format data object 426. Additionally, in some embodiments, the visualization may include a set of interactive graphical elements for a defined domain task. Additionally, a rendering of the visualization may be initiated via a user interface such as, for example, a user interface of the client computing entity 102. In some embodiments, the one or more downstream systems 406 may generate a fallout error 440 based on the converted structured data object 404'. For example, the fallout error 440 may be leveraged to establish a secondary feedback loop by publishing error codes/types and/or descriptions back to a user (e.g., the client computing entity 102) when a converted structured data object 404' fails data validation due to being unfit for downstream processing via the one or more downstream systems 406. In some embodiments, the fallout error 440 may be presented to the user via the validation user interface 430.

In some embodiments, the computing system 101 includes a service (e.g., cloud-based service, a service hosted by one or more servers, etc.) that is invoked by the validation user interface or another user interface at a client device (e.g., the client computing entity 102) to perform one or more of the data processing platform 402, the predictive machine learning model 424, and/o the one or more downstream systems 406.

Figure 5:
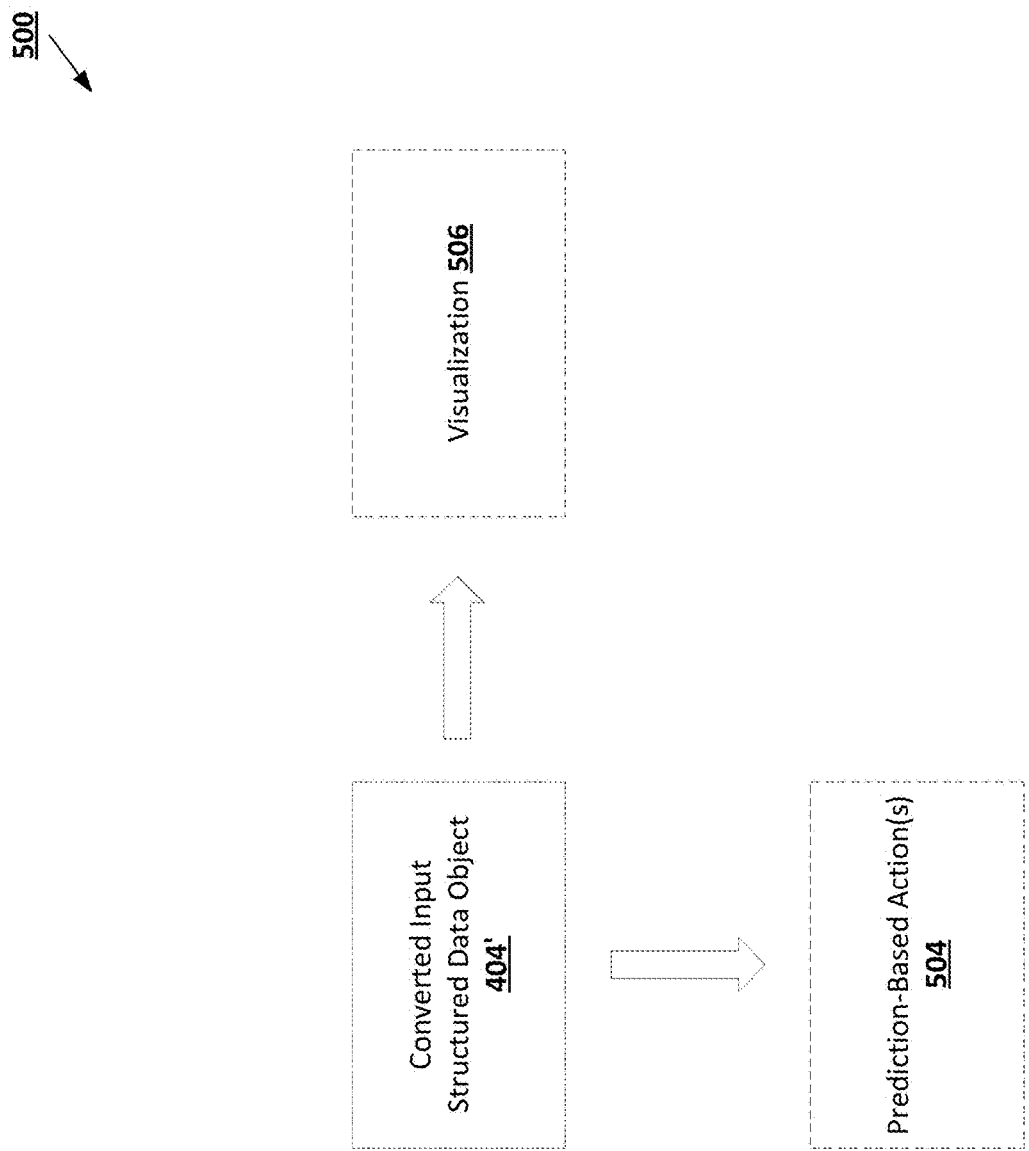
FIG. 5 provides an example system for providing prediction-based actions and/or visualizations in accordance with one or more embodiments discussed herein.

FIG. 5 illustrates an example system 500 for providing prediction-based actions and/or visualizations, in accordance with one or more embodiments of the present disclosure. The system 500 includes the converted input structured data object 404' provided by the data processing platform 402. In one or more embodiments, one or more prediction-based actions 504 are performed based on the converted input structured data object 404'. For example, the performance of the one or more prediction-based actions 504 may be initiated based on the converted input structured data object 404'. In some embodiments, the performance of the one or more prediction-based actions 504 may be initiated via a machine learning model. For example, the performance of the one or more prediction-based actions 504 may be initiated via a predictive machine learning model that is trained for a different predictive task than the predictive machine learning model 424. In some embodiments, data associated with the converted input structured data object 404' may be stored in a storage system, such as the volatile memory 215, the non-volatile memory 210, the volatile memory 322, or the non-volatile memory 324. The data stored in the storage system may be employed for providing user interface renderings, graphical visualizations, machine learning, recommendations, reporting, decision-making purposes, operations management, healthcare management, and/or other purposes. In certain embodiments, the data stored in the storage system may be employed to provide one or more insights to assist with healthcare decision making processes, such as, medical decisions for a patient. Additionally or alternatively, one or more machine learning models (e.g., the predictive machine learning model 424) may be retrained based on one or more features associated with the converted input structured data object 404'. For example, one or more relationships between features mapped in the predictive machine learning model 424 may be adjusted (e.g., refitted) based on data associated with the converted input structured data object 404'. In another example, cross-validation, hyperparameter optimization, and/or regularization associated with the predictive machine learning model 424 may be adjusted based on one or more features associated with the converted input structured data object 404'. Additionally or alternatively, a visualization 506 may be generated based on the converted input structured data object 404'. The visualization 506 may include, for example, one or more interactive graphical elements for a user interface (e.g., an electronic interface of a user device) based on the converted input structured data object 404'.

In some embodiments, the one or more prediction-based actions 504 may include automated user interface actions, automated alerts, automated instructions to user devices, and/or automated adjustments to allocations of computing resources. Further, the one or more prediction-based actions 504 may include automated physician notification actions, automated patient notification actions, automated appointment scheduling actions, automated prescription recommendation actions, automated record updating actions, automated datastore updating actions, automated workforce management operational management actions, automated server load balancing actions, automated resource allocation actions, automated pricing actions, automated plan update actions, automated alert generation actions, generating one or more electronic communications, and/or the like. The one or more prediction-based actions 504 may further include displaying visual renderings of the aforementioned examples of prediction-based actions in addition to values, charts, and representations associated with the one or more policy scores and the prediction output using a prediction output user interface such as, for example, the visualization 506.

Figure 6:
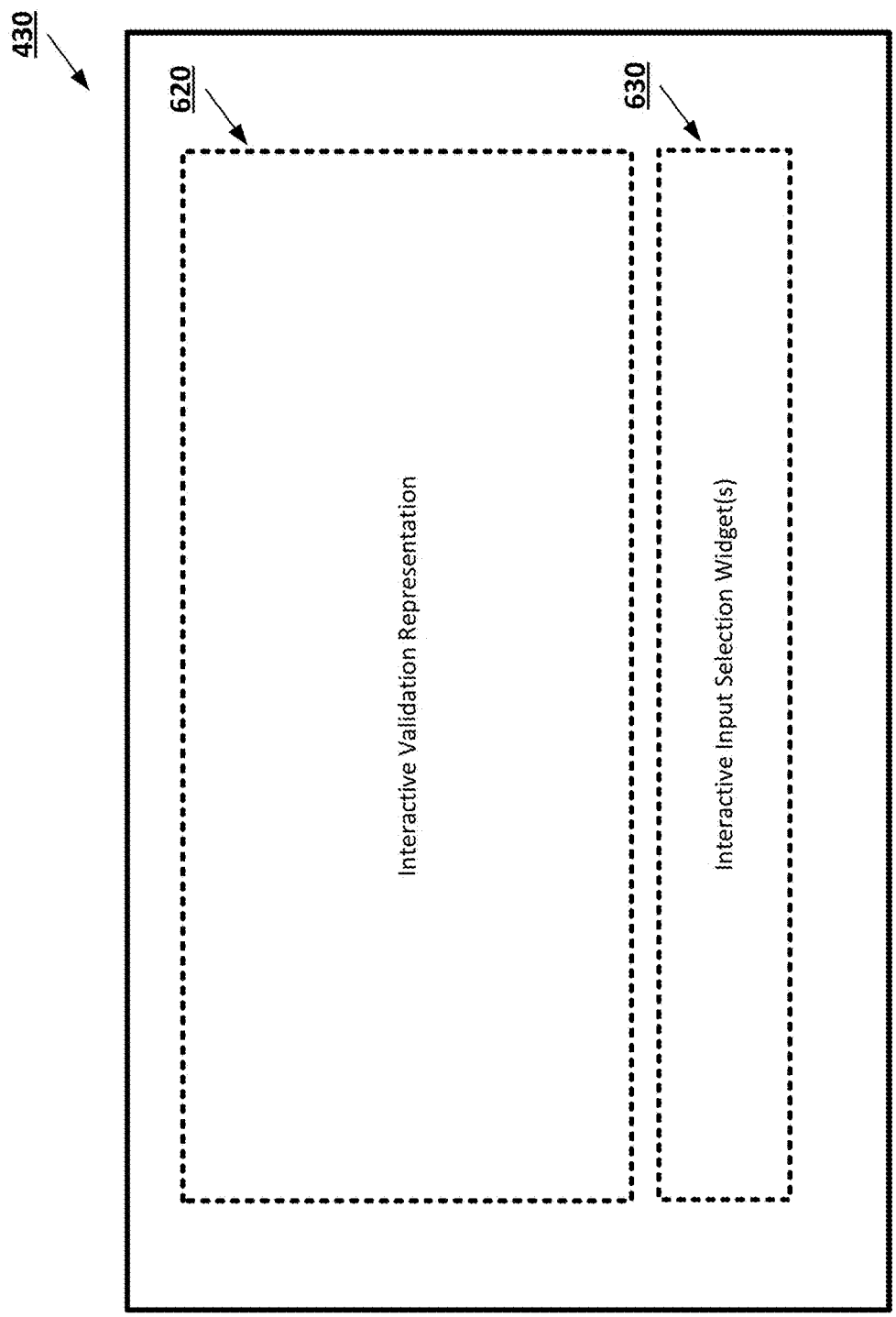
FIG. 6 provides an example validation user interface in accordance with one or more embodiments discussed herein.

FIG. 6 illustrates an example validation user interface 430, in accordance with one or more embodiments of the present disclosure. In one or more embodiments, the validation user interface 430 is, for example, an electronic interface (e.g., a graphical user interface) of the client computing entity 102. In various embodiments, the validation user interface 430 may be provided via the output device 316 of the client computing entity 102. The validation user interface 430 may be configured to render an interactive validation representation 620. Additionally or alternatively, the validation user interface 430 may be configured to render one or more interactive input selection widgets 630. In various embodiments, the interactive validation representation 620 may provide an interactive visualization associated with the predictive mapped format data object 426 to facilitate input of the confirmation input 432. In some embodiments, the one or more interactive input selection widgets 630 may be configured to receive the confirmation input 432. In various embodiments, the validation user interface 430 may be configured as a web portal interface (e.g., a medical provider portal, etc.) for managing the predictive machine learning model 424, the data processing platform 402, and/or formatting for input structured data objects such as, for example, the input structured data object 404. In some embodiments, a user interaction with a particular widget of the one or more interactive input selection widgets 630 may result in rendering of a new interactive input selection widget. In some embodiments, a user interaction with a particular widget of the one or more interactive input selection widgets 630 may include a user edit (e.g., a modification) and/or an augmentation to a historical mapped format data object stored in the historical mapped format database 420.

Figure 7:
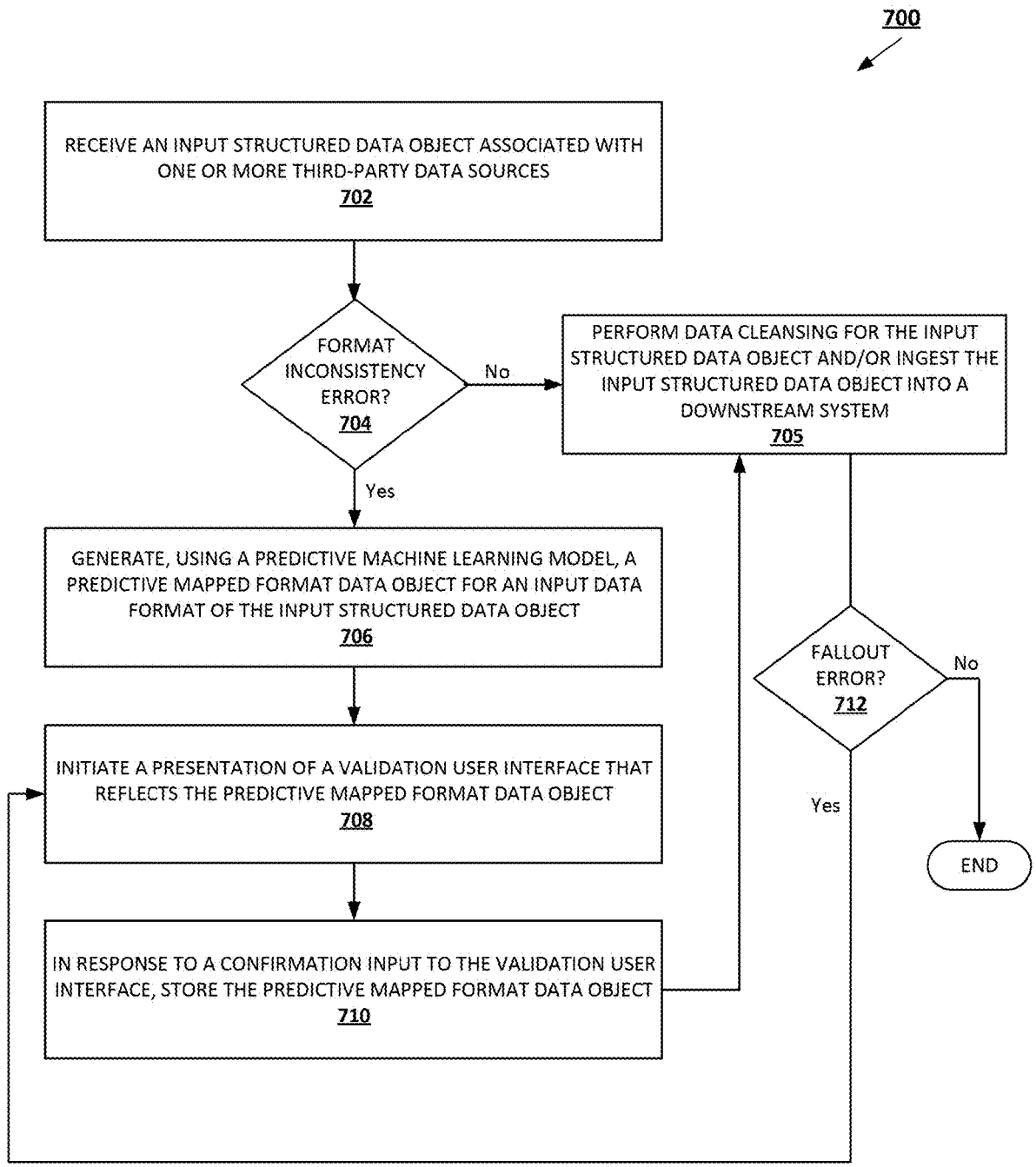
FIG. 7 is a flowchart diagram of an example process for providing predictive mapped formatting for data in accordance with one or more embodiments discussed herein.

FIG. 7 is a flowchart diagram of an example process 700 for providing predictive mapped formatting for data in accordance with some embodiments discussed herein. The process 700 may be implemented by one or more computing devices, entities, and/or systems (e.g., the computing system 101 and/or the predictive computing entity 106) described herein. For example, via the various steps/operations of the process 700, the computing system 101 may leverage improved data processing and/or machine learning techniques to format and/or cleanse data related to one or more third-party data sources. By doing so, the process 700 enables the generation of formatted data that automatically adapts to a defined domain task, while ensuring data quality in view of various data processing and/or machine learning rules.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, receiving an input structured data object associated with one or more third-party data sources. For example, the computing system 101 may receive an input structured data object comprising a plurality of input data elements that are structured according to an input data format.

In some embodiments, the process 700 includes, at step/operation 704, determining whether a format inconsistency error exists. For example, the computing system 101 may identify a format inconsistency error for the input structured data object based on a comparison between the input data format and a plurality of historical mapped format data objects.

If no (e.g., it is determined that a format inconsistency error does not exist), in some embodiments, the process 700 includes, at step/operation 705, performing data cleansing for the input structured data object and/or ingest the input structured data object into a downstream system.

However, if yes (e.g., it is determined that a format inconsistency error exists), in some embodiments, the process 700 includes, at step/operation 706, generating, using a predictive machine learning model, a predictive mapped format data object for an input data format of the input structured data object. For example, in response to identifying the format inconsistency error, the computing system 101 may generate, using a predictive machine learning model, a predictive mapped format data object for the input data format based on the plurality of input data elements of the input structured data object and a plurality of predictive features associated with the plurality of historical mapped format data objects.

In some embodiments, the process 700 includes, at step/operation 708, initiating a presentation of a validation user interface that reflects the predictive mapped format data object. For example, in response to identifying the format inconsistency error, the computing system 101 may initiate a presentation of a validation user interface that reflects the predictive mapped format data object.

In some embodiments, the process 700 includes, at step/operation 710 and in response to a confirmation input to the validation user interface, storing the predictive mapped format data object. For example, in response to a confirmation input to the validation user interface, the computing system 101 may store the predictive mapped format data object as a historical mapped format data object of the plurality of historical mapped format data objects.

In some embodiments, after step/operation 710, the process 700 may proceed to step/operation 705 to perform data cleansing for the input structured data object and/or ingest the input structured data object into a downstream system. For example, after step/operation 710, the computing system 101 may perform data cleansing for the input structured data object and/or ingest the input structured data object into a downstream system based on the predictive mapped format data object.

In some embodiments, the process 700 includes, at step/operation 712, determining whether a fallout error exists. For example, the computing system 101 may identify a fallout error associated with the downstream system based on the input structured data object. If no (e.g., it is determined that a fallout error does not exist), in some embodiments, the process 700 may end. However, if yes (e.g., it is determined that a fallout error exists), in some embodiments, the process 700 may return to step/operation 708. For example, in response to identifying the fallout error, the computing system 101 may establish a secondary feedback loop by publishing error codes/types and/or descriptions back to a user (e.g., the client computing entity 102). In some embodiments, the fallout error may be presented to the user via the validation user interface.

Some techniques of the present disclosure enable the generation of action outputs that may be performed to initiate one or more real world actions to achieve real-world effects. The data processing and machine learning techniques of the present disclosure may be used, applied, and/or otherwise leveraged to generate reliable data objects, which may help in the creation and provisioning of messages across computing entities, as well as other downstream tasks such as rendering of a visualization via a user interface. For instance, generative output, using some of the techniques of the present disclosure, may trigger the performance of actions at a client device, such as the display, transmission, and/or the like of data reflective of a visualization. In some embodiments, the visualization may trigger an alert via a user interface.

In some examples, the computing tasks may include actions that may be based on a defined domain task. A defined domain task may include any environment in which computing systems may be applied to generate a visualization and initiate the performance of computing tasks responsive to a visualization. These actions may cause real-world changes, for example, by controlling a hardware component of a user device or a server device, providing alerts, interactive actions, and/or the like. For instance, actions may include the initiation of automated instructions across and between devices, automated notifications, automated scheduling operations, automated precautionary actions, automated security actions, automated data processing actions, and/or the like.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Some embodiments of the present disclosure may be implemented by one or more computing devices, entities, and/or systems described herein to perform one or more example operations, such as those outlined below. The examples are provided for explanatory purposes. Although the examples outline a particular sequence of steps/operations, each sequence may be altered without departing from the scope of the present disclosure. For example, some of the steps/operations may be performed in parallel or in a different sequence that does not materially impact the function of the various examples. In other examples, different components of an example device or system that implements a particular example may perform functions at substantially the same time or in a specific sequence.

Moreover, although the examples may outline a system or computing entity with respect to one or more steps/operations, each step/operation may be performed by any one or combination of computing devices, entities, and/or systems described herein. For example, a computing system may include a single computing entity that is configured to perform all of the steps/operations of a particular example. In addition, or alternatively, a computing system may include multiple dedicated computing entities that are respectively configured to perform one or more of the steps/operations of a particular example. By way of example, the multiple dedicated computing entities may coordinate to perform all of the steps/operations of a particular example.

Example 1. A computer-implemented method comprising: receiving, by one or more processors, an input structured data object comprising a plurality of input data elements that are structured according to an input data format; identifying, by the one or more processors, a format inconsistency error for the input structured data object based on a comparison between the input data format and a plurality of historical mapped format data objects; in response to identifying the format inconsistency error, (i) generating, by the one or more processors and using a predictive machine learning model, a predictive mapped format data object for the input data format based on the plurality of input data elements of the input structured data object and a plurality of predictive features associated with the plurality of historical mapped format data objects, and (ii) initiating, by the one or more processors, a presentation of a validation user interface that reflects the predictive mapped format data object; and in response to a confirmation input to the validation user interface, storing, by the one or more processors, the predictive mapped format data object as a historical mapped format data object of the plurality of historical mapped format data objects.

Example 2. The computer-implemented method of example 1, wherein: (i) the input data format defines a plurality of input data types, (ii) a historical mapped format data object of the plurality of historical mapped format data objects comprises (a) a historical data format that defines a plurality of historical data types and (b) one or more historical type matches that respectively identify one or more first target data types respectively corresponding to one or more historical data types of the plurality of historical data types, and (iii) the predictive mapped format data object comprises (a) the input data format and (b) one or more input type matches that respectively identify one or more second target data types that respectively correspond to one or more input data types of the plurality of input data types.

Example 3. The computer-implemented method of any of the above examples, wherein the format inconsistency error is identified based on a comparison between the plurality of input data types and the plurality of historical data types.

Example 4. The computer-implemented method of any of the above examples, wherein the predictive machine learning model comprises a neural network architecture that is pretrained using a labeled training dataset and finetuned using the plurality of historical mapped format data objects.

Example 5. The computer-implemented method of any of the above examples, wherein the labeled training dataset comprises a plurality of labeled data elements, each including a target data type label and a training data element reflective of one or more predictive features of the plurality of predictive features.

Example 6. The computer-implemented method of any of the above examples, wherein: (i) a historical mapped format data object of the plurality of historical mapped format data objects comprises (a) a historical data format that defines a plurality of historical data types, (b) a historical type match that identifies a target data type corresponding to a historical data type of the plurality of historical data types, and (c) a plurality of historical data elements that correspond to the historical data type, (ii) the target data type is used as a target data type label for each of the plurality of historical data elements, and (iii) the predictive machine learning model is trained, using one or more reinforcement training techniques, to learn one or more of the plurality of predictive features that correspond to the target data type based on the plurality of historical data elements.

Example 7. The computer-implemented method of any of the above examples, wherein the input data format defines a plurality of input data types, the predictive mapped format data object comprises an input type match that identifies a target data type corresponding to an input data type of the plurality of input data types, and initiating the presentation of the validation user interface comprises: providing, via the validation user interface, an interactive validation representation that comprises (i) a plurality of target data type representations respectively corresponding to a plurality of target data types and (ii) a plurality of interactive input selection widgets respectively corresponding to the plurality of target data type representations; and prepopulating an interactive input selection widget of the plurality of interactive input selection widgets that corresponds to the target data type with the input data type.

Example 8. The computer-implemented method of any of the above examples, wherein the input type match is based on one or more match scores respectively corresponding to one or more target data types of the plurality of target data types and prepopulating the interactive input selection widget that corresponds to the target data type further comprises: selecting the target data type from the one or more target data types based on the one or more match scores; and prepopulating the interactive input selection widget that corresponds to the target data type based on the selection of the target data type.

Example 9. The computer-implemented method of any of the above examples, wherein the predictive mapped format data object comprises one or more input type matches for each of the plurality of target data types and prepopulating the interactive input selection widget that corresponds to the target data type further comprises: identifying at least two input data types that correspond to the target data type based on the one or more input type matches for each of the plurality of target data types; and in response to identifying the at least two input data types, (i) prepopulating a dropdown selection widget of the interactive input selection widget with the at least two input data types, and (ii) assigning a flag to a target data type representation of the plurality of target data type representations that corresponds to the target data type.

Example 10. The computer-implemented method of claim of any of the above examples, wherein the confirmation input is indicative of a selection of a particular input data type from the dropdown selection widget.

Example 11. The computer-implemented method of claim of any of the above examples, wherein the predictive mapped format data object comprises a plurality of input type matches that identify an input data type for each of a plurality of target data types defined by a target data format, the confirmation input is indicative of a confirmation of the plurality of input type matches, and the computer-implemented method further comprises, in response to the confirmation input: generating, using the predictive mapped format data object, a converted input structured data object by converting the plurality of input data elements of the input structured data object from the input data format to the target data format, and ingesting the converted input structured data object.

Example 12. A computing system comprising memory and one or more processors communicatively coupled to the memory, the one or more processors configured to: receive an input structured data object comprising a plurality of input data elements that are structured according to an input data format; identify a format inconsistency error for the input structured data object based on a comparison between the input data format and a plurality of historical mapped format data objects; in response to identifying the format inconsistency error, (i) generate, using a predictive machine learning model, a predictive mapped format data object for the input data format based on the plurality of input data elements of the input structured data object and a plurality of predictive features associated with the plurality of historical mapped format data objects, and (ii) initiate a presentation of a validation user interface that reflects the predictive mapped format data object; and in response to a confirmation input to the validation user interface, store the predictive mapped format data object as a historical mapped format data object of the plurality of historical mapped format data objects.

Example 13. The computing system of example 12, wherein: (i) the input data format defines a plurality of input data types, (ii) a historical mapped format data object of the plurality of historical mapped format data objects comprises (a) a historical data format that defines a plurality of historical data types and (b) one or more historical type matches that respectively identify one or more first target data types respectively corresponding to one or more historical data types of the plurality of historical data types, and (iii) the predictive mapped format data object comprises (a) the input data format and (b) one or more input type matches that respectively identify one or more second target data types that respectively correspond to one or more input data types of the plurality of input data types.

Example 14. The computing system of examples 12 to 13, wherein the format inconsistency error is identified based on a comparison between the plurality of input data types and the plurality of historical data types.

Example 15. The computing system of examples 12 to 14, wherein the predictive machine learning model comprises a neural network architecture that is pretrained using a labeled training dataset and finetuned using the plurality of historical mapped format data objects.

Example 16. The computing system of examples 12 to 15, wherein the labeled training dataset comprises a plurality of labeled data elements, each including a target data type label and a training data element reflective of one or more predictive features of the plurality of predictive features.

Example 17. The computing system of examples 12 to 16, wherein: (i) a historical mapped format data object of the plurality of historical mapped format data objects comprises (a) a historical data format that defines a plurality of historical data types, (b) a historical type match that identifies a target data type corresponding to a historical data type of the plurality of historical data types, and (c) a plurality of historical data elements that correspond to the historical data type, (ii) the target data type is used as a target data type label for each of the plurality of historical data elements, and (iii) the predictive machine learning model is trained, using one or more reinforcement training techniques, to learn one or more of the plurality of predictive features that correspond to the target data type based on the plurality of historical data elements.

Example 18. The computing system of examples 12 to 17, wherein the input data format defines a plurality of input data types, the predictive mapped format data object comprises an input type match that identifies a target data type corresponding to an input data type of the plurality of input data types, and the one or more processors are further configured to: provide, via the validation user interface, an interactive validation representation that comprises (i) a plurality of target data type representations respectively corresponding to a plurality of target data types and (ii) a plurality of interactive input selection widgets respectively corresponding to the plurality of target data type representations; and prepopulate an interactive input selection widget of the plurality of interactive input selection widgets that corresponds to the target data type with the input data type.

Example 19. The computing system of examples 12 to 18, wherein the input type match is based on one or more match scores respectively corresponding to one or more target data types of the plurality of target data types, and the one or more processors are further configured to: select the target data type from the one or more target data types based on the one or more match scores; and prepopulate the interactive input selection widget that corresponds to the target data type based on the selection of the target data type.

Example 20. One or more non-transitory computer-readable storage media including instructions that, when executed by one or more processors, cause the one or more processors to: receive an input structured data object comprising a plurality of input data elements that are structured according to an input data format; identify a format inconsistency error for the input structured data object based on a comparison between the input data format and a plurality of historical mapped format data objects; in response to identifying the format inconsistency error, (i) generate, using a predictive machine learning model, a predictive mapped format data object for the input data format based on the plurality of input data elements of the input structured data object and a plurality of predictive features associated with the plurality of historical mapped format data objects, and (ii) initiate a presentation of a validation user interface that reflects the predictive mapped format data object; and in response to a confirmation input to the validation user interface, store the predictive mapped format data object as a historical mapped format data object of the plurality of historical mapped format data objects.

Example 21: The computer-implemented method of example 1, wherein the predictive machine learning model is a supervised machine learning model and the method further comprises receiving training data for the predictive machine learning model and training the predictive machine learning model using the training data.

Example 22: The computer-implemented method of example 1, wherein the training is performed by the one or more processors.

Example 23: The computer-implemented method of example 1, wherein: the one or more processors are included in a first computing entity; and the training is performed by one or more other processors included in a second computing entity.

Example 24. The computing system of example 12, wherein the one or more processors are further configured to train the supervised machine learning model.

Example 25. The computing system of example 24, wherein the one or more processors are included in a first computing entity; and the supervised machine learning model is trained by one or more other processors included in a second computing entity.

Example 26. The one or more non-transitory computer-readable storage media of example 20, wherein the instructions further cause the one or more processors to train the supervised machine learning model.

Example 27. The one or more non-transitory computer-readable storage media of example 26, wherein the one or more processors are included in a first computing entity; and the supervised machine learning model is trained by one or more other processors included in a second computing entity.

The invention claimed is:

1. A computer-implemented method comprising:
   receiving, by one or more processors, an input structured data object comprising a plurality of input data elements that are structured according to an input data format;
   identifying, by the one or more processors, a format inconsistency error for the input structured data object based on a comparison between the input data format and a plurality of historical mapped format data objects;
   in response to identifying the format inconsistency error:
      (i) generating, by the one or more processors and using a predictive machine learning model, a predictive mapped format data object for the input data format based on the plurality of input data elements of the input structured data object and a plurality of predictive features associated with the plurality of historical mapped format data objects, and
      (ii) initiating, by the one or more processors, a presentation of a validation user interface that reflects the predictive mapped format data object; and
   in response to a confirmation input to the validation user interface, storing, by the one or more processors, the predictive mapped format data object as a historical mapped format data object of the plurality of historical mapped format data objects.

2. The computer-implemented method of claim 1, wherein:
   (i) the input data format defines a plurality of input data types,
   (ii) the historical mapped format data object of the plurality of historical mapped format data objects comprises (a) a historical data format that defines a plurality of historical data types and (b) one or more historical type matches that respectively identify one or more first target data types respectively corresponding to one or more historical data types of the plurality of historical data types, and
   (iii) the predictive mapped format data object comprises (a) the input data format and (b) one or more input type matches that respectively identify one or more second target data types that respectively correspond to one or more input data types of the plurality of input data types.

3. The computer-implemented method of claim 2, wherein the format inconsistency error is identified based on a comparison between the plurality of input data types and the plurality of historical data types.

4. The computer-implemented method of claim 1, wherein the predictive machine learning model comprises a neural network architecture that is pretrained using a labeled training dataset and finetuned using the plurality of historical mapped format data objects.

5. The computer-implemented method of claim 4, wherein the labeled training dataset comprises a plurality of labeled data elements, each including a target data type label and a training data element reflective of one or more predictive features of the plurality of predictive features.

6. The computer-implemented method of claim 4, wherein:
   (i) the historical mapped format data object of the plurality of historical mapped format data objects comprises (a) a historical data format that defines a plurality of historical data types, (b) a historical type match that identifies a target data type corresponding to a historical data type of the plurality of historical data types, and (c) a plurality of historical data elements that correspond to the historical data type,
   (ii) the target data type is used as a target data type label for each of the plurality of historical data elements, and
   (iii) the predictive machine learning model is trained, using one or more reinforcement training techniques, to learn one or more of the plurality of predictive features that correspond to the target data type based on the plurality of historical data elements.

7. The computer-implemented method of claim 1, wherein the input data format defines a plurality of input data types, the predictive mapped format data object comprises an input type match that identifies a target data type corresponding to an input data type of the plurality of input data types, and initiating the presentation of the validation user interface comprises:
   providing, via the validation user interface, an interactive validation representation that comprises (i) a plurality of target data type representations respectively corresponding to a plurality of target data types and (ii) a plurality of interactive input selection widgets respectively corresponding to the plurality of target data type representations; and
   prepopulating an interactive input selection widget of the plurality of interactive input selection widgets that corresponds to the target data type with the input data type.

8. The computer-implemented method of claim 7, wherein the input type match is based on one or more match scores respectively corresponding to one or more target data types of the plurality of target data types and prepopulating the interactive input selection widget that corresponds to the target data type further comprises:
   selecting the target data type from the one or more target data types based on the one or more match scores; and
   prepopulating the interactive input selection widget that corresponds to the target data type based on the selection of the target data type.

9. The computer-implemented method of claim 7, wherein the predictive mapped format data object comprises one or more input type matches for each of the plurality of target data types and prepopulating the interactive input selection widget that corresponds to the target data type further comprises:
   identifying at least two input data types that correspond to the target data type based on the one or more input type matches for each of the plurality of target data types; and
   in response to identifying the at least two input data types:
   (i) prepopulating a dropdown selection widget of the interactive input selection widget with the at least two input data types, and
   (ii) assigning a flag to a target data type representation of the plurality of target data type representations that corresponds to the target data type.

10. The computer-implemented method of claim 9, wherein the confirmation input is indicative of a selection of a particular input data type from the dropdown selection widget.

11. The computer-implemented method of claim 1, wherein the predictive mapped format data object comprises a plurality of input type matches that identify an input data type for each of a plurality of target data types defined by a target data format, the confirmation input is indicative of a confirmation of the plurality of input type matches, and the computer-implemented method further comprises, in response to the confirmation input:
   generating, using the predictive mapped format data object, a converted input structured data object by converting the plurality of input data elements of the input structured data object from the input data format to the target data format, and
   ingesting the converted input structured data object.

12. A computing system comprising memory and one or more processors communicatively coupled to the memory, the one or more processors configured to:
   receive an input structured data object comprising a plurality of input data elements that are structured according to an input data format;
   identify a format inconsistency error for the input structured data object based on a comparison between the input data format and a plurality of historical mapped format data objects;
   in response to identifying the format inconsistency error:
   (i) generate, using a predictive machine learning model, a predictive mapped format data object for the input data format based on the plurality of input data elements of the input structured data object and a plurality of predictive features associated with the plurality of historical mapped format data objects, and
   (ii) initiate a presentation of a validation user interface that reflects the predictive mapped format data object; and
   in response to a confirmation input to the validation user interface, store the predictive mapped format data object as a historical mapped format data object of the plurality of historical mapped format data objects.

13. The computing system of claim 12, wherein:
   (i) the input data format defines a plurality of input data types,
   (ii) the historical mapped format data object of the plurality of historical mapped format data objects comprises (a) a historical data format that defines a plurality of historical data types and (b) one or more historical type matches that respectively identify one or more first target data types respectively corresponding to one or more historical data types of the plurality of historical data types, and (iii) the predictive mapped format data object comprises (a) the input data format and (b) one or more input type matches that respectively identify one or more second target data types that respectively correspond to one or more input data types of the plurality of input data types.

14. The computing system of claim 13, wherein the format inconsistency error is identified based on a comparison between the plurality of input data types and the plurality of historical data types.

15. The computing system of claim 12, wherein the predictive machine learning model comprises a neural network architecture that is pretrained using a labeled training dataset and finetuned using the plurality of historical mapped format data objects.

16. The computing system of claim 15, wherein the labeled training dataset comprises a plurality of labeled data elements, each including a target data type label and a training data element reflective of one or more predictive features of the plurality of predictive features.

17. The computing system of claim 15, wherein:
(i) the historical mapped format data object of the plurality of historical mapped format data objects comprises (a) a historical data format that defines a plurality of historical data types, (b) a historical type match that identifies a target data type corresponding to a historical data type of the plurality of historical data types, and (c) a plurality of historical data elements that correspond to the historical data type,
(ii) the target data type is used as a target data type label for each of the plurality of historical data elements, and
(iii) the predictive machine learning model is trained, using one or more reinforcement training techniques, to learn one or more of the plurality of predictive features that correspond to the target data type based on the plurality of historical data elements.

18. The computing system of claim 12, wherein the input data format defines a plurality of input data types, the predictive mapped format data object comprises an input type match that identifies a target data type corresponding to an input data type of the plurality of input data types, and wherein to initiate the presentation of the validation user interface the one or more processors are further configured to:
provide, via the validation user interface, an interactive validation representation that comprises (i) a plurality of target data type representations respectively corresponding to a plurality of target data types and (ii) a plurality of interactive input selection widgets respectively corresponding to the plurality of target data type representations; and
prepopulate an interactive input selection widget of the plurality of interactive input selection widgets that corresponds to the target data type with the input data type.

19. The computing system of claim 18, wherein the input type match is based on one or more match scores respectively corresponding to one or more target data types of the plurality of target data types, and wherein to prepopulate the interactive input selection widget that corresponds to the target data type the one or more processors are further configured to:
select the target data type from the one or more target data types based on the one or more match scores; and
prepopulate the interactive input selection widget that corresponds to the target data type based on the selection of the target data type.

20. One or more non-transitory computer-readable storage media including instructions that, when executed by one or more processors, cause the one or more processors to:
receive an input structured data object comprising a plurality of input data elements that are structured according to an input data format;
identify a format inconsistency error for the input structured data object based on a comparison between the input data format and a plurality of historical mapped format data objects;
in response to identifying the format inconsistency error:
(i) generate, using a predictive machine learning model, a predictive mapped format data object for the input data format based on the plurality of input data elements of the input structured data object and a plurality of predictive features associated with the plurality of historical mapped format data objects, and
(ii) initiate a presentation of a validation user interface that reflects the predictive mapped format data object; and
in response to a confirmation input to the validation user interface, store the predictive mapped format data object as a historical mapped format data object of the plurality of historical mapped format data objects.

\* \* \* \* \*